United States Patent
Daniel et al.

(10) Patent No.: US 11,023,248 B2
(45) Date of Patent: Jun. 1, 2021

(54) ASSURED APPLICATION SERVICES

(71) Applicant: British Telecommunications Public Limited Company, London (GB)

(72) Inventors: Joshua Daniel, London (GB); Gery Ducatel, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/086,109

(22) PCT Filed: Mar. 3, 2017

(86) PCT No.: PCT/EP2017/055091
§ 371 (c)(1),
(2) Date: Sep. 18, 2018

(87) PCT Pub. No.: WO2017/167548
PCT Pub. Date: Oct. 5, 2017

(65) Prior Publication Data
US 2020/0409719 A1    Dec. 31, 2020

(30) Foreign Application Priority Data
Mar. 30, 2016    (EP) ..................................... 16162923

(51) Int. Cl.
*G06F 9/44*           (2018.01)
*G06F 8/36*           (2018.01)
(Continued)

(52) U.S. Cl.
CPC .................. *G06F 9/44* (2013.01); *G06F 8/36* (2013.01); *G06F 9/546* (2013.01); *H04L 9/0643* (2013.01);
(Continued)

(58) Field of Classification Search
CPC . H04W 48/14; G06Q 20/382; G06Q 20/0655; G06Q 20/02; G06Q 20/3829;
(Continued)

(56) References Cited

U.S. PATENT DOCUMENTS

| | | |
|---|---|---|
| 6,192,405 B1 | 2/2001 | Bunnell |
| 6,636,898 B1 | 10/2003 | Ludovici et al. |

(Continued)

FOREIGN PATENT DOCUMENTS

| | | |
|---|---|---|
| EP | 2381363 A2 | 10/2011 |
| EP | 2101599 B1 | 9/2013 |

(Continued)

OTHER PUBLICATIONS

"A Next-Generation Smart Contract and Decentralized Application Platform" Ethereum White Paper, 2016, retrieved from https://github.com/ethereum/wiki/wiki/White-Paper.

(Continued)

*Primary Examiner* — Tuan A Vu
(74) *Attorney, Agent, or Firm* — Patterson Thuente Pedersen, P.A.

(57) ABSTRACT

A computer implemented method to execute a software application in a network attached computing environment, the application being defined by a set of required software services to constitute the application, the required services being selected from services indicated in a component registry, the method including recording a block to a blockchain data structure, the new block identifying at least a subset of the set of required services; receiving one or more further blocks from the blockchain data structure, each of the further blocks referencing a service provider for providing one or more of the required services; and selecting one or more service providers identified in the blockchain and defining a specification for an application assembler com- (Continued)

ponent to assemble the software application, the specification identifying selected service providers.

7 Claims, 11 Drawing Sheets

(51) Int. Cl.
*G06F 9/54* (2006.01)
*H04L 9/06* (2006.01)
*G06Q 20/38* (2012.01)
*G06Q 20/32* (2012.01)
*G06Q 20/02* (2012.01)

(52) U.S. Cl.
CPC ......... *G06Q 20/02* (2013.01); *G06Q 20/3227* (2013.01); *G06Q 20/3829* (2013.01); *H04L 2209/127* (2013.01); *H04L 2209/38* (2013.01)

(58) Field of Classification Search
CPC . G06Q 20/3227; H04L 9/006; H04L 2209/38; H04L 9/0643; G06F 9/44
See application file for complete search history.

(56) References Cited

U.S. PATENT DOCUMENTS

| | | |
|---|---|---|
| 7,716,739 B1 | 5/2010 | McCorkendale et al. |
| 7,797,748 B2 | 9/2010 | Zheng et al. |
| 7,870,153 B2 | 1/2011 | Croft et al. |
| 8,271,974 B2 | 9/2012 | Mazhar et al. |
| 8,375,437 B2 | 2/2013 | Linsley et al. |
| 8,479,294 B1 | 7/2013 | Li et al. |
| 8,516,241 B2 | 8/2013 | Chang et al. |
| 8,739,155 B2 | 5/2014 | Hehir et al. |
| 9,009,825 B1 | 4/2015 | Chang et al. |
| 9,183,378 B2 | 11/2015 | Banerjee et al. |
| 9,235,813 B1 | 1/2016 | Qian et al. |
| 9,466,051 B1 | 10/2016 | Roth et al. |
| 9,495,668 B1 | 11/2016 | Juels et al. |
| 9,807,106 B2 | 10/2017 | Daniel et al. |
| 2002/0100035 A1 | 7/2002 | Kenyon et al. |
| 2002/0120725 A1 | 8/2002 | DaCosta et al. |
| 2003/0084349 A1 | 5/2003 | Friedrichs et al. |
| 2003/0204644 A1 | 10/2003 | Vincent |
| 2004/0015977 A1 | 1/2004 | Benke et al. |
| 2004/0268296 A1 | 12/2004 | Kayam et al. |
| 2005/0027846 A1 | 2/2005 | Wolfe |
| 2005/0091269 A1 | 4/2005 | Gerber et al. |
| 2006/0282660 A1 | 12/2006 | Varghese et al. |
| 2009/0254499 A1 | 10/2009 | Deyo |
| 2010/0011029 A1 | 1/2010 | Niemelae et al. |
| 2010/0262873 A1 | 10/2010 | Chang et al. |
| 2011/0197070 A1 | 8/2011 | Mizrah |
| 2011/0265154 A1 | 10/2011 | Furlan et al. |
| 2011/0265164 A1 | 10/2011 | Lucovsky et al. |
| 2012/0053925 A1 | 3/2012 | Geffin et al. |
| 2012/0215727 A1 | 8/2012 | Malik et al. |
| 2012/0233678 A1 | 9/2012 | Pal |
| 2012/0246290 A1 | 9/2012 | Kagan |
| 2012/0284794 A1 | 11/2012 | Trent et al. |
| 2012/0304007 A1 | 11/2012 | Hanks et al. |
| 2012/0311526 A1 | 12/2012 | DeAnna et al. |
| 2013/0006949 A1 | 1/2013 | Essawi et al. |
| 2013/0013767 A1 | 1/2013 | Stober |
| 2013/0047139 A1 | 2/2013 | Bolton |
| 2014/0013319 A1 | 1/2014 | Hehir et al. |
| 2014/0067734 A1 | 3/2014 | Hawkins et al. |
| 2014/0096230 A1 | 4/2014 | Wade |
| 2014/0137244 A1 | 5/2014 | Banerjee et al. |
| 2014/0164251 A1 | 6/2014 | Loh et al. |
| 2014/0180738 A1 | 6/2014 | Phillipps et al. |
| 2014/0215490 A1 | 7/2014 | Mathur et al. |
| 2014/0298011 A1 | 10/2014 | Ganesan |
| 2014/0344015 A1 | 11/2014 | Puértolas-Montañés et al. |
| 2014/0358825 A1 | 12/2014 | Phillipps et al. |
| 2014/0372346 A1 | 12/2014 | Phillipps et al. |
| 2015/0120567 A1 | 4/2015 | Van et al. |
| 2015/0134606 A1 | 5/2015 | Magdon-Ismail et al. |
| 2015/0215832 A1* | 7/2015 | Fitzpatrick ............ H04W 48/14 455/426.1 |
| 2015/0227741 A1 | 8/2015 | Permeh et al. |
| 2015/0244690 A1* | 8/2015 | Mossbarger ............ H04L 9/006 713/171 |
| 2015/0271318 A1 | 9/2015 | Antos et al. |
| 2015/0332283 A1 | 11/2015 | Witchey |
| 2015/0332395 A1 | 11/2015 | Walker et al. |
| 2015/0356523 A1 | 12/2015 | Madden |
| 2015/0356555 A1 | 12/2015 | Pennanen et al. |
| 2015/0363876 A1 | 12/2015 | Ronca et al. |
| 2015/0379423 A1 | 12/2015 | Dirac et al. |
| 2016/0048771 A1 | 2/2016 | Chen et al. |
| 2016/0057041 A1 | 2/2016 | Gupta et al. |
| 2016/0078367 A1 | 3/2016 | Adjaoute |
| 2016/0086175 A1 | 3/2016 | Finlow-Bates et al. |
| 2016/0098730 A1 | 4/2016 | Feeney |
| 2016/0164884 A1 | 6/2016 | Sriram et al. |
| 2016/0221186 A1 | 8/2016 | Perrone |
| 2016/0260095 A1 | 9/2016 | Ford |
| 2016/0275461 A1* | 9/2016 | Sprague ............ G06Q 20/0655 |
| 2016/0283920 A1 | 9/2016 | Fisher et al. |
| 2016/0350173 A1 | 12/2016 | Ahad |
| 2017/0063886 A1 | 3/2017 | Muddu et al. |
| 2017/0109735 A1 | 4/2017 | Sheng et al. |
| 2017/0124534 A1 | 5/2017 | Savolainen et al. |
| 2017/0132630 A1* | 5/2017 | Castinado ............ G06Q 20/382 |
| 2017/0279774 A1 | 9/2017 | Booz et al. |
| 2017/0279818 A1 | 9/2017 | Milazzo et al. |
| 2017/0286083 A1 | 10/2017 | Dimitrakos et al. |
| 2017/0286136 A1 | 10/2017 | Dimitrakos et al. |
| 2017/0302629 A1 | 10/2017 | El-Moussa et al. |
| 2018/0025166 A1 | 1/2018 | Daniel et al. |
| 2018/0144114 A1 | 5/2018 | Fiske et al. |
| 2018/0232526 A1 | 8/2018 | Reid et al. |
| 2018/0285585 A1 | 10/2018 | Daniel et al. |
| 2019/0036895 A1 | 1/2019 | Irvine |
| 2019/0050541 A1 | 2/2019 | Wright et al. |
| 2019/0139136 A1 | 5/2019 | Molinari et al. |

FOREIGN PATENT DOCUMENTS

| | | |
|---|---|---|
| EP | 2816469 A1 | 12/2014 |
| EP | 3101599 A2 | 12/2016 |
| GB | 2540976 A | 2/2017 |
| GB | 2540977 | 2/2017 |
| GB | 2540977 A | 2/2017 |
| WO | WO-0184285 A2 | 11/2001 |
| WO | WO-2008124560 A1 | 10/2008 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 | 11/2015 |
| WO | WO-2016034496 A1 | 3/2016 |
| WO | WO-2016077127 A1 | 5/2016 |
| WO | WO-2016191639 A1 | 12/2016 |
| WO | WO-2017021153 A1 | 2/2017 |
| WO | WO-2017021154 A1 | 2/2017 |
| WO | WO-2017021155 A1 | 2/2017 |
| WO | WO-2017054985 A1 | 4/2017 |
| WO | WO-2017/167547 A1 | 10/2017 |
| WO | WO-2017167548 A1 | 10/2017 |
| WO | WO-2017167549 A1 | 10/2017 |
| WO | WO-2017167550 A1 | 10/2017 |
| WO | WO-2018178026 | 10/2018 |
| WO | WO-2018178034 | 10/2018 |
| WO | WO-2018178035 | 10/2018 |
| WO | WO-2018206374 | 11/2018 |
| WO | WO-2018206405 | 11/2018 |
| WO | WO-2018206406 | 11/2018 |
| WO | WO-2018206407 | 11/2018 |
| WO | WO-2018206408 | 11/2018 |
| WO | WO2018228950 | 12/2018 |
| WO | WO2018228951 | 12/2018 |

(56) References Cited

FOREIGN PATENT DOCUMENTS

| | | |
|---|---|---|
| WO | WO2018228952 | 12/2018 |
| WO | WO2018228973 | 12/2018 |
| WO | WO2018228974 | 12/2018 |

OTHER PUBLICATIONS

Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arxiv.org/ftp/arxiv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.
Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Antonopoulos A M., "Mastering Bitcoin—Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
Application and Filing Receipt for U.S. Appl. No. 15/749,289, filed Jan. 31, 2018, Inventor(s): Ducatel et al.
Application and Filing Receipt for U.S. Appl. No. 15/749,338, filed Jan. 31, 2018, Inventor(s): Daniel et al.
Application and Filing Receipt for U.S. Appl. No. 15/749,391, filed Jan. 31, 2018, Inventor(s): Daniel et al.
U.S. Appl. No. 15/508,209, filed Mar. 2, 2017, Inventor(s): Dimitrakos et al.
Assia Y., et al., "Colored Coins Whitepaper," 2015, available at docs.google.com/document/d/1AnkPcVZTCMLizw4DvsW6M8Q2JCOllzrTLuoWu2z1BE, 23 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28, 2018, from https://arxiv.org/pdf/1505.02142.pdf, Kirchhoff-Institute for Physics, May 2015, 9 pages.
Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Cruz J.P., et al., "The Bitcoin Network as Platform for TransOrganizational Attribute Authentication," Web 2015, The Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
Czepluch J.S., et al., "The Use of Block Chain Technology in Different Application Domains," XP055242451, retrieved from http://http://www.lollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Extended European Search Report for Application No. EP15179440.1, dated Feb. 10, 2016, 6 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., in "On Intelligence, How a New Understanding of the Brain Will Lead to the Creation of Truly Intelligent Machines," Times Books, ISBN 0-8050-7 456-2, 2004, 174 pages.
Hawkins, et al., "Why Neurons Have Thousands of Synapses, a Theory of Sequence Memory in Neocortex," Published in Frontiers in Neural Circuits (10 (2016) 1-13, doi:10.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Search Report and Written Opinion for Application No. PCT/EP2015/069670, dated Nov. 11, 2015, 8 pages.
International Search Report and Written Opinion for Application No. PCT/EP2015/069673, dated Nov. 12, 2015, 10 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055095, dated Apr. 11, 2017, 10 pages.
International Preliminary Report on Patentability for Application No. PCT/EP2017/055095, dated Oct. 11, 2018, 8 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.

(56) References Cited

OTHER PUBLICATIONS

Adler M., "Threat Intelligence Visibility—the way forward," BT, 2015, available from www.globalservices.bt.com/uk/en/products/assure threat_ monitoring.
Miller A., "The State-of-the-Art of Smart Contracts" Jan. 19, 2016, XP055306766, Luxemburg retrieved from the Internet: URL: http://wwwfr.uni.lu/snt/news_events/speaker s_presentations on Sep. 29, 2016, pp. 7-8, 16 and 18.
Numenta, "Biological and Machine Intelligence (BAMI), a living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, a Strategy Employed by VI?" Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenField1997.pdf, Dec. 24, 1996, 15 pages.
Plohmann D., et al., "Case study of the Miner Botnet", Cyber Conflict (CYCON), 2012 4th International Conference on Jun. 5, 2012, pp. 1-16.
International Search Report and Written Opinion for PCT Application No. PCT/EP2016/067308, dated Sep. 21, 2016, 8 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Purdy S., "Encoding Data for HTM Systems," Available from Cornell University Library (citation arXiv: 1602.05925), retrieved on Mar. 28, 2018 from https://arxiv.org/ftp/arxiv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
International Preliminary Report on Patentability for Application No. PCT/EP2015/069670, dated Mar. 16, 2017, 7 pages.
International Preliminary Report on Patentability for Application No. PCT/EP2015/069673, dated Mar. 16, 2017, 9 pages.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
International Preliminary Report on Patentability for Application No. PCT/EP2017/055094, dated Oct. 11, 2018, 8 pages.
International Search Report and Written Opinion for Application No. PCT/EP2017/055094, dated May 15, 2017, 10 pages.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2015.
Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.
U.S. Appl. No. 15/508,190, filed Mar. 2, 2017, Inventor(s): Dimitrakos et al.
Bakshi et al., "Securing cloud from DDOS Attacks using Intrusion Detection System in Virtual Machine," IEEE, 2010, 5 pg., (Year: 2010).
Bellifemine et al., "JADE: A software framework for developing multi-agent applications. Lessons learned", Elsevier, 2007, 12 pg. (Year: 2007).
Jin et al., "A guest-transparent file integrity monitoring method in virtualization environment," Elsevier, 2010, 11 pg. (Year: 2010).
Zambonelli et al., "Agent-Oriented Software Engineering for Internet Applications," Published as Chapter 13 in the book "Coordination of Internet Agents: Models, Technologies, and Applications," Springer, 2000, 21 pg. (Year: 2000).
Combined Search and Examination Report for Great Britain Application No. 1707377.6, dated Nov. 9, 2017, 9 pages.
Combined Search and Examination Report for Great Britain Application No. 1707379.2, dated Nov. 9, 2017, 9 pages.
International Preliminary Report for Application No. PCT/EP2018/061261, dated Nov. 21, 2019, 8 pages.
International Search Report and Written Opinion for Application No. PCT/EP2018/061405, dated Jun. 20, 2018, 12 pages.
International Search Report and Written Opinion for Application No. PCT/EP2018/061406, dated Jun. 20, 2018, 13 pages.
Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.
Combined search and Examination Report under Sections 17 and 18(3) for Great Britain Application No. 1707376.8, dated Nov. 9, 2017, 8 pages.
Combined search and Examination Report under Sections 17 and 18(3) for Great Britain Application No. 1707378.4, dated Nov. 9, 2017, 11 pages.
European Search Report for Application No. EP17164006.3, dated Jun. 29, 2017, 6 pages.
Extended European Search Report for Application No. 17170020.6, dated Nov. 10, 2017, 8 pages.
Extended European Search Report for Application No. 17170022.2, dated Nov. 16, 2017, 8 pages.
Extended European Search Report for Application No. 17170024.8, dated Nov. 10, 2017, 10 pages.
International Preliminary Report on Patentability for Application No. PCT/EP2016/052865, dated Aug. 24, 2017, 9 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.
International Preliminary Report on Patentability for Application No. PCT/EP2018/061408, dated Nov. 21, 2019, 10 pages.
International Search Report and Written Opinion for Application No. PCT/EP2016/052865, dated Mar. 17, 2016, 11 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 9 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.

(56) References Cited

OTHER PUBLICATIONS

International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
Patel H, "A block chain based decentralized exchange," International Association for Cryptologic Research, XP061017563, Dec. 18, 2014, vol. 20141225:065012, 9 pages.
Search Report dated Nov. 8, 2017 for Great Britain Application No. GB1707381.8, 7 pages.
Wu J., et al., "Hierarchical Temporal Memory Method for Time-Series-Based Anomaly Detection," 2016, IEEE, 16th International Conference Data Mining Workshops, XP033055893, Dec. 12, 2016, pp. 1167-1172.
Zupan B., et al., "Machine Learning by Function Decomposition," ICML 1997, Retrieved from https://citeseerx.ist.psu.edu/viewdoc/download?doi=10.1.1.29.4455&rep=rep1&type=pdf on Oct. 17, 2017, 9 pages.
Application and Filing Receipt for U.S. Appl. No. 15/223,261, filed Jul. 29, 2016, Inventor(s): Daniel et al.
Application and Filing Receipt for U.S. Appl. No. 15/548,654, filed Aug. 3, 2017, Inventor(s): Daniel et al.
Application and Filing Receipt for U.S. Appl. No. 15/939,650, filed Mar. 29, 2018, Inventor(s): Daniel et al.
Application and Filing Receipt for U.S. Appl. No. 16/498,827, filed Sep. 27, 2019, Inventor(s): Daniel et al.
Application and Filing Receipt for U.S. Appl. No. 16/498,880, filed Sep. 27, 2019, Inventor(s): Daniel et al.
Application and Filing Receipt for U.S. Appl. No. 16/498,932, filed Sep. 27, 2019, Inventor(s): Daniel et al.
Application and Filing Receipt for U.S. Appl. No. 16/611,682, filed Nov. 7, 2019, Inventor(s): Ghanea-Hercock.
Application and Filing Receipt for U.S. Appl. No. 16/611,686, filed Nov. 7, 2019, Inventor(s): Ghanea-Hercock.
Application and Filing Receipt for U.S. Appl. No. 16/611,694, filed Nov. 7, 2019, Inventor(s): Ghanea-Hercock.
Application and Filing Receipt for U.S. Appl. No. 16/611,701, filed Nov. 7, 2019, Inventor(s): Ghanea-Hercock.
Application and Filing Receipt for U.S. Appl. No. 16/611,707, filed Nov. 7, 2019, Inventor(s): Ghanea-Hercock.
Andreas M. Antonopoulos, "Mastering Bitcoin. Unlocking Digital Crypto-Currencies." O'Reilly Media, Apr. 2014, 282 pages.
Roger Piqueras Jover et al., "dHSS—distributed Peer-to-Peer implementation of the LTE Hss based on the bitcoin/namecoin architecture," 2016 IEEE International Conference on Communications Workshops (ICC), IEEE, May 23, 2016, pp. 354-359, XP032919891, DOI: 10.1109/ICCW.2016.7503813.
Tomoyuki Sanda et al., "Proposal of new authentication method in Wi-Fi access using Bitcoin 2.0," 2016 IEEE 5th Global Conference on Consumer Electronics, IEEE, Oct. 11, 2016, pp. 1-5, XP033032268, DOI: 10.1109/GTCCE.2016.78000479.
Deloitte, "Blockchain @ Telco How blockchain can impact the telecommunications industry and its relevance to the C-Suite Introduction to blockchain," Nov. 28, 2016, XP0555394340, Retrieved from the Internet: URL: https://www2.deloitte.com/content/dam/Deloitte/za/Documents/technology-media-telecommunications/za_TMT_Blockchain_TelCo.pdf [retrieved Jul. 27, 2017] p. 9-p. 20.
APPLESUPPORTCOMMUNITIES_Configurethe_2014_5pgs_EFS.pdf, 5, Non Patent Literature, 237 KB.
BAKSHI_SecuringCloud_2010_5pgs_EFS.pdf, 5, Non Patent Literature, 600 KB.
BLLIFEMINE_JADE_2007_12pgs_EFS.pdf, 12, Non Patent Literature, 1240 KB.
BITAR_VPNapplicabilityandNV03_21Oct2013_60pgs_EFS.pdf, 60, Non Patent Literature, 1861 KB.
FilingReceipt_US15524486_09May2017_176pgs_EFS.pdf, 176, Non Patent Literature, 7571 KB.
HAO_Securecloudcomputing_2010_10pgs_EFS.pdf, 10, Non Patent Literature, 1012 KB.
IDS_TRANSMITTAL.pdf, 2, Transmittal Letter, 84 KB.
ISR_WO_PCTEP2015075688_19Jan2016_12pgs_EFS.pdf, 12, Other Reference—Patent/App/Search documents, 412 KB.
JIN_Guest_2010_11pgs_EFS.pdf, 11, Non Patent Literature, 984 KB.
KAUFMAN_trustedenvironment_2010_3pgs_EFS.pdf, 3, Non Patent Literature, 443 KB.
Microsoft_VirtualPrivateNetwork_28Mar2003_18pgs_EFS.pdf, 18, Non Patent Literature, 1440 KB.
OSGI_Architecture_13Jan2016_8pgs_EFS.pdf, 8, Non Patent Literature, 901 KB.
SuperUser_VPNConection_9Feb2014_2pgs_EFS.pdf, 2, Non Patent Literature, 76 KB.
WO2008124560A1_EFS.pdf, 47, Foreign Reference, 1558 KB.
WO2017167548A1_EFS.pdf, 41, Foreign Reference, 2107 KB.
ZAMBONELLI_Agent_2000_21pgs_EFS.pdf, 21, Non Patent Literature, 1282 KB.
APPLESUPPORTCOMMUNITIES_Configurethe_2014_5pgs_EFS.pdf, E398EC075C6680277FB1599A619872FE0077B4BF71D4B5 0F5DF335FD102DE7220750570C16AB3E2894170BC1856FF93A F142F6A462ECEF70BB1F98A8E0E5BA60.
BAKSHI_SecuringCloud_2010_5pgs_EFS.pdf, 400257537334510 FC6C8D70CBE1447E271E607F8CE9FEC2001F6D494C8DE5497 5BE2AC3B020D972F88915DCD7567E4232A5BDBF09D5B503C ECC2B8FD0F69E780.
BELLIFEMINE_JADE_2007_12pgs_EFS.pdf, 446C6B4EF98E9D 5765CA984C58625A47A7F3C2204A25CD85AD79DAF953747F F1F7F4C685975DFF7B1E86A7E5362BBCD821A208B720ACAE 1CAF81226281D4B066.
BITAR_VPNapplicabilityandNV03_21Oct2013_60pgs_EFS.pdf, 71B3360F5003F3FDC0BF737AF9AAF16A9D94C6F66E78B76F3 121D3427D634FF24F50F6F34582CF43AD421C8AA5829FE6CA F862C37EE29B68304A74EAF5F763.
HAO_Securecloudcomputing_2010_10pgs_EFS.pdf, 03244457D9 5D0ACAAD93E2D9E35B8FA2D413CE274972FAC44B823AC86 41391A4B2F63CE08D3AE0DD522E36907B042520B1502BAD9 ACF721A79002D6C1134533C.
ISR_WO_PCTEP2015075688_19Jan2016_12pgs_EFS.pdf, 9E400 E32C9C01F9C55D7E64402DAA22B9140AB0B4A6A3F2039FB2 11A13959ADAF8A3D39243877908980E6551F14B6D97DC6376 3B0724A2082AAEF02582330047.
JIN_Guest_2010_11pgs_EFS.pdf, AB9E376BE68A9EDED8C368 2FE077C9922089279D411DF65D979F737BD184F70E0B2FDFE EC75023EDDD91BC5C7C54B0D487FBC5DA86E294C884AFAE AA669BCC35.
KAUFMAN_trustedenvironment_2010_3pgs_EFS.pdf, 1DD7A82 1FEF8730F222DC9742445E76381E85642581627C1746CEBAF1 E94C9D01671225A336A88CAD1D68D6AC086A0979166BDBB5 2B189658E9A6127AC42B31DA.
Microsoft_VirtualPrivateNetwork_28Mar2003_18pgs_EFS.pdf, DB291 7A2C84D705E39EAE1EB9D2726B0007D6E92A638A1BBEE1B 38AF52DFE56607AC3CE0645EB814C5E4206B2FFD14D93EBC F58482FDF602767AB0DE4D1E8789.
OSGI_Architecture_13Jan2016_8pgs_EFS.pdf, 04E7760956252D 8B93414DD05FFA830D584701B997B700DB092CC8EB81D48F1 A996B52A015D887547155A4C7C342AD3321FF3EDB0A0670F DC5189157CB7FC82B.
SuperUser_VPNConnection_9Feb2014_2pgs_EFS.pdf, B6D1C765 1382EDAABC59352F9C8A6096685BFEA94CECD90CD0124A0 E2ED6459C88823FB21714AAE08C11907807E1DEC1FC72474D EA914069F0A7AABC6EDFB866.
WO2008124560A1_EFS.pdf, AAE6EC659871E7DAADF20D235 1AAF99CF2FACDF4589E46323B4B42CECAF7636C6DE8501A 34216D58BA584B8C028B91FB3A2A10422603CA5F3042C8621 5EFB7D6.
WO2017167548A1_EFS.pdf, AD4EC46B73FC1CB1585BD9CB2 1F0F4309FBAE4972177522450C22EE8729714C79E6490997F4D DF24A9A82B47BC9072B88FD6712BA3A423DF55E5E372980 D7B6C.
ZAMBONELLI_Agent_2000_21pgs_EFS.pdf, 00AE1503F1BEB3 7116456ED56E0D1EDB2CF7FEEC6951EBF6EB0C8EF2D7D25 C8709BD2A17ED2A89760182BF25947EE81CFEB012CDDCB2 CBA4D483D5A902084EEA.

(56) References Cited

OTHER PUBLICATIONS

Apple Support Communities, "How to Configure the "Per App VPN" feature in iOS 7?," Feb. 9, 2014, retreived from: http://discussions.apple.com/thread/5318472, 5 pages.
Application and Filing Receipt for U.S. Appl. No. 15/525,486, filed May 9, 2017, Inventors: El-Moussa et al.,176 pages.
Bakshi A., et al., "Securing Cloud from DDOS Attacks using Intrusion Detection System in Virtual Machine," IEEE, 2010, 5 pages.
Bellifemine F., et al., "JADE: A Software Framework for Developing Multi-Agent Applications. Lessons Learned," Elsevier, 2008, 12 pages.
Bitar N., et al., "Cloud Networking: VPN Applicability and NV03 Gap Analysis," Internet Engineering Task Force, IETF, Standard working draft, Internet Society (iSOC), Oct. 21, 2013, 60 pages.
Hao et al., "Secure cloud computing with a virtualized network infrastructure," Alcatel-Lucent, http://www.usenix.org/legacy/event/hotdoud10/tech/slides/hao.pdf, 2010, 10 pages.
International Search Report and Written Opinion for Application No. PCT/EP2015/075688, dated Jan. 19, 2016, 12 pages.
Jin H., et al., "A Guest-Transparent File Integrity Monitoring Method in Virtualization Environment," Elsevier, 2010, 11 pages.
Kaufman L.M., "Can a trusted environment provide security?" iEEE Security & Privacy, XP011300922, Jan./Feb. 2010, vol. 6 (1), p. 50-52.
Microsoft, "How VPN Works: Virtual Private Network (VPN)," Updated, Accessed on Feb. 9, 2014, https://technet.microsoft.com/enus/library/cc779919, Mar. 28, 2003, 18 pages.
Osgi, "OSGi Architecture," Jan. 13, 2016, retrieved from https://web.archive.org/web/20160113114200/https://www.osgi.org/developer/architecture/ on Oct. 3, 2019, 8 Pages.
Super User, "Use VPN Connection Only for Selected Application," Accessed on Feb. 9, 2014, http://superuser.com/questions/294008/use-vpn-connection-only-for-selected-Application, 2 pages.
Zambonelli F., et al., "Agent-Oriented Software Engineering for Internet Applications," Published as Chapter 13 in the Book, Coordination of Internet Agents: Models, Technologies, and Applications, Springer, 2000, 21 pages.

* cited by examiner

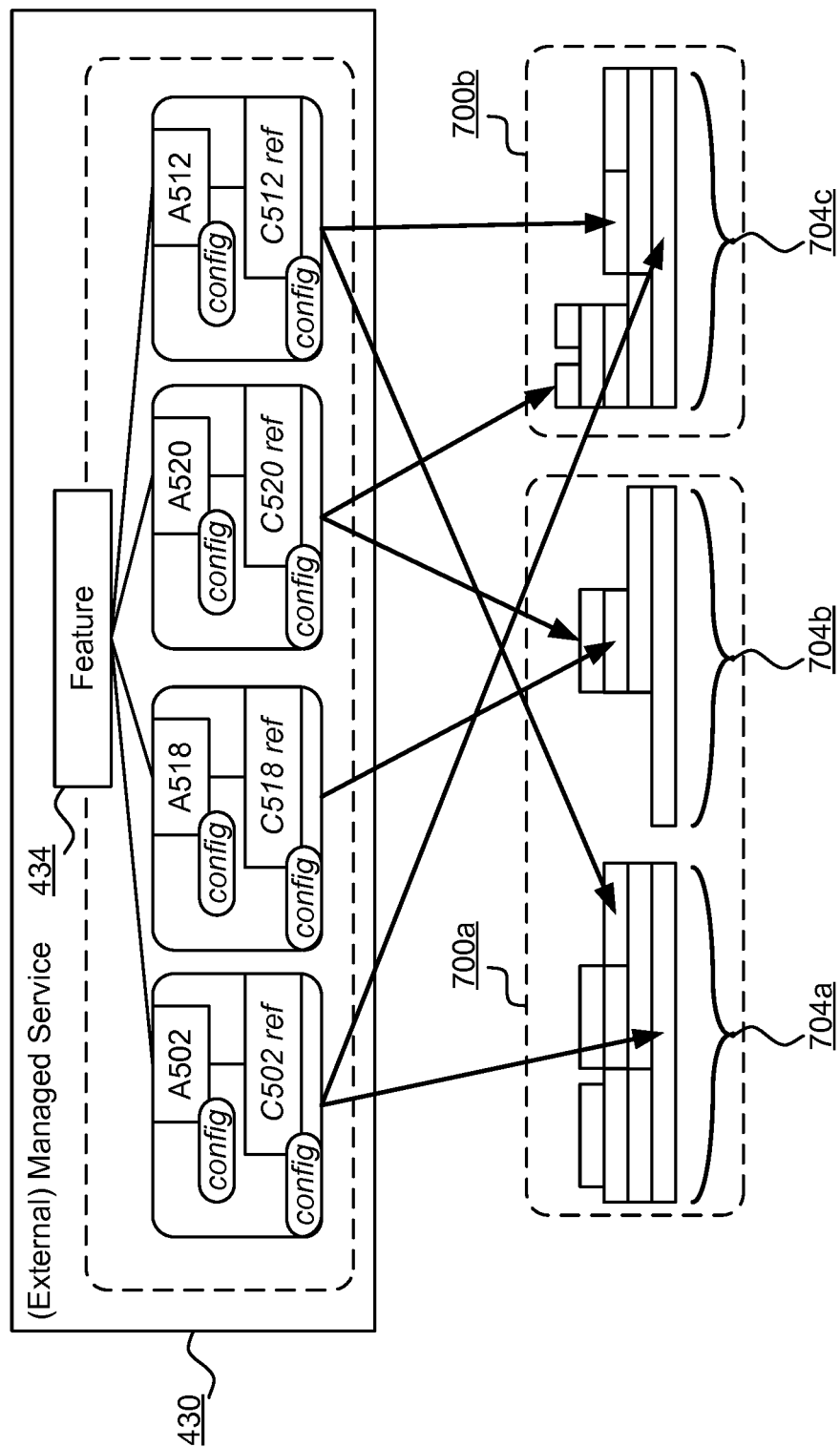

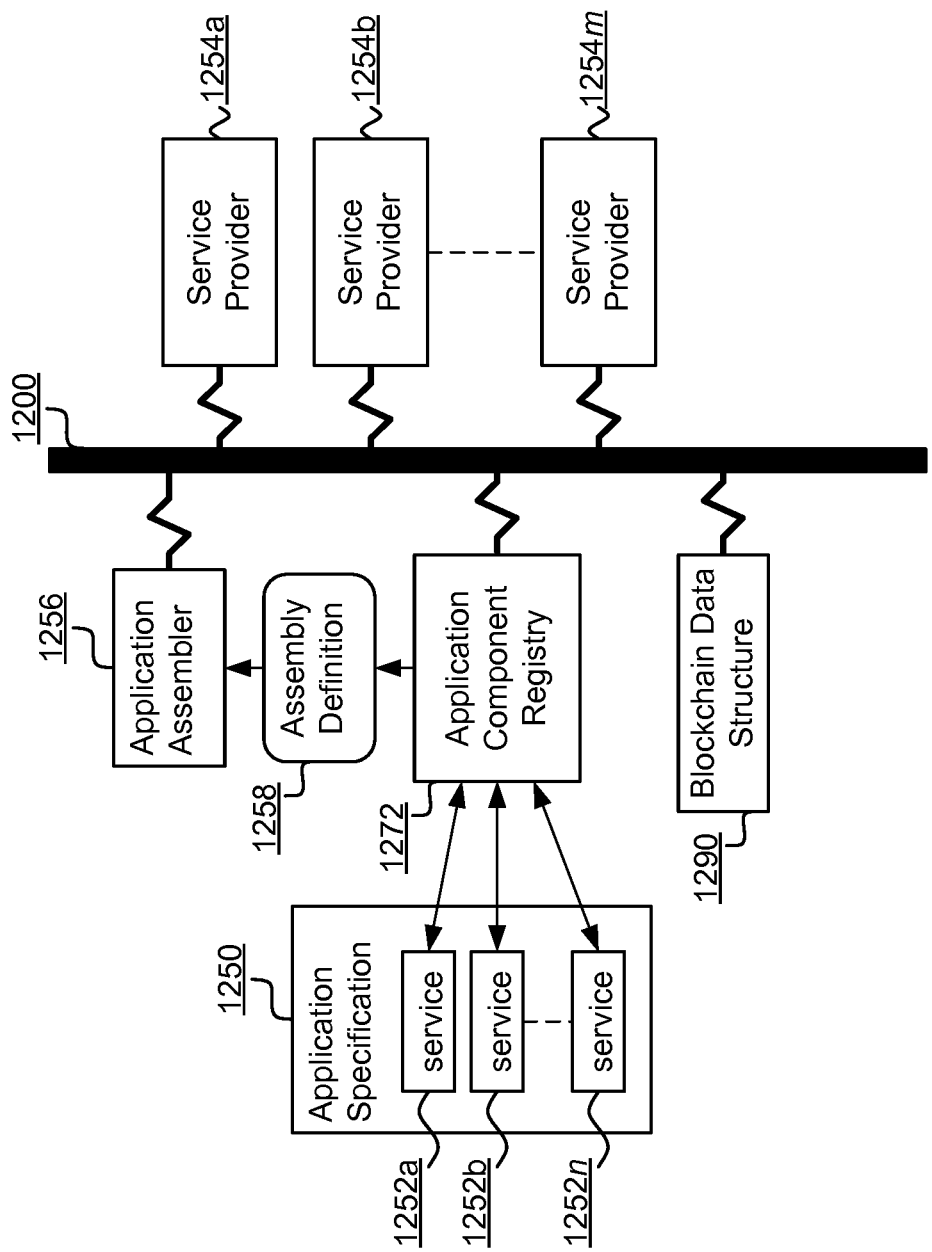

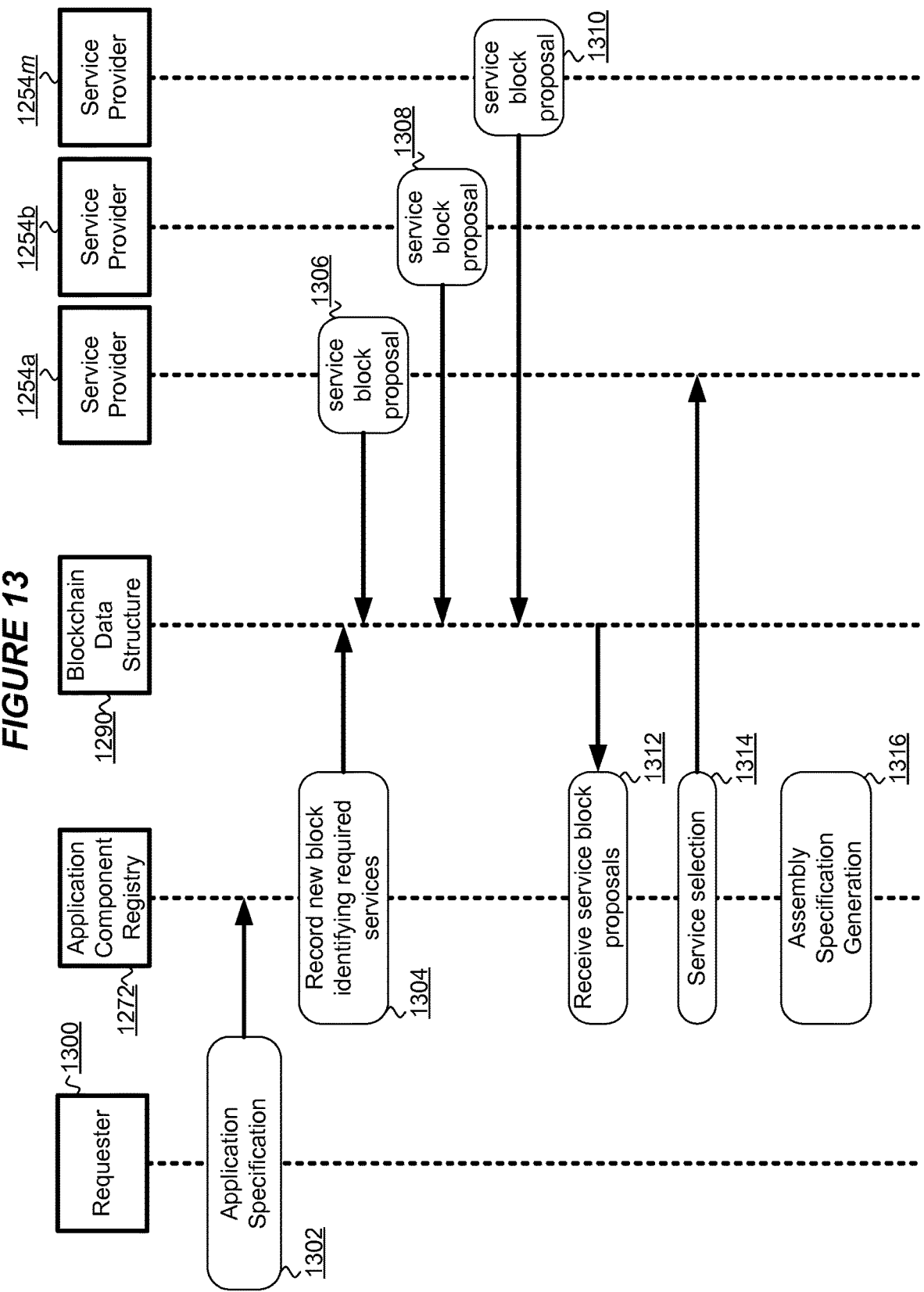

ASSURED APPLICATION SERVICES

CROSS-REFERENCE TO RELATED APPLICATION

The present application is a National Phase entry of PCT Application No. PCT/EP2017/055091, filed Mar. 3, 2017, which claims priority from EP Patent Application No. 16162923.3, filed Mar. 30, 2016 each of which is hereby fully incorporated herein by reference.

TECHNICAL FIELD

The present disclosure relates to the provision of software features for applications deployed to networked computing environments. In particular it relates to software features for applications deployed to cloud computing environments, the features being provided by networked environments external to a cloud environment.

BACKGROUND

Historically, organizations and businesses developed or acquired bespoke or off-the-shelf software solutions for execution using dedicated computer hardware. Such software solutions find broad application in many varied areas of business such as: financial management; sales and order handling; record storage and management; human resource record management; payroll; marketing and advertising; internet presence, etc. The acquisition, management and maintenance of such software and hardware can require costly investment in systems development, management and revision—functions that can extend beyond the core business concerns of an organization.

As organizations increasingly seek to decouple such systems management from their core business processes to control costs, breadth of concern and liabilities, dedicated service offerings are provided to take the place of in-house systems. Computer systems are increasingly provided by third parties as services in the same way as utilities, a shift that has been partly facilitated by improvements in the availability of high-speed network connections allowing consuming businesses to access and use networked third party systems. Such systems can include substantially all aspects of a business computer system including hardware, operating systems software, file systems and data storage software including database applications and the like, middleware and transaction handling software, and commercial software. In this way consuming businesses can be relieved of concerns relating to the exact nature, arrangement and management of computing systems and focus resources elsewhere. The computing system is abstracted from the consuming business and can be logically thought of as a "cloud" in which all system concerns are encapsulated and at least partly managed by a third party. Thus, such arrangements are known as "cloud computing."

Service providers can provide computing infrastructure on a service basis, either using dedicated hardware or hardware shared by multiple systems employing, for example, virtualization software. Such services can be described as Infrastructure as a Service (or IaaS). Service providers can also provide software platform resources such as, inter alia, operating systems, execution runtime environments, databases, middleware, network services such as web servers and development tools and the like. Such services can be described as Platform as a Service (or PaaS). Generally, all such facilities can be described as Software as a Service (SaaS).

Infrastructure and platform services can be implemented so as to abstract any particular deployed application from underlying resources employed. A software application may require specific resources, for example a specific operating system, execution environment, database and web server. The application can be deployed to a platform provided by a platform service provider, the platform having potentially many and numerous alternative resources being selected and configured to satisfy the specific requirements of the application. Further, the platform itself can operate with an infrastructure provided by an infrastructure service provider, certain attributes and resources of which may be at least partly specified for the application. The infrastructure may also have many and numerous alternative resources being selected and configured to satisfy the requirements of the platform and the application. Thus, an application deployment can involve an assembly of multiple resources selected from a potentially greater number of available resources at each of the application, platform and infrastructure level.

The selection of resources by a systems integrator on behalf of a consuming business depends upon resource availability by service providers. That is to say that a third party service provider must provide, support and manage a resource for a systems integrator to utilize the resource in an application assembly. As consuming businesses depend increasingly on SaaS, the ability to select particular resources for assembly is supplemented by a requirement to select particular features, characteristics or functions of resources as part of an assembly, such features being common to potentially multiple resources. For example, data security services such as encryption can be required across many disparate resources in a cloud application from a file system and data storage to networking and database. Further, the exact nature, quality and formulation of a service may be subject to organizational, legal and/or regulatory requirements, all of which much be satisfied by a cloud service provider if a cloud consumer is to successfully deploy a cloud application.

A cloud service provider that does not provide a required resource, facility or feature may be unusable by a cloud consumer. In some cases, a cloud service provider may provide part of a feature, such as a feature for a subset of software components available to cloud consumers using the service provider. For example, a particular encryption feature may be available for a database product at a cloud service provider but may not be available for file systems or networking. Further, management of features common to many resources of components in a cloud application may involve managing multiple disparate components. For example, encryption of a file system may be managed by a file system or operating system management interface, whereas equivalent encryption of a database may be managed by a database control panel. Yet further, where a cloud consumer deploys cloud applications across multiple cloud environments, such as multiple public cloud environments or a combination of public and private cloud environments, the use of features may require many different management and configuration services for each component employing the feature in each application in each cloud environment. Thus the potential for a lack of availability of features within cloud environments, coupled with the potential for a lack of availability of features for all components, coupled with a need to manage features separately for different cloud applications, different cloud environments and different components introduces considerable burdens to cloud consumers.

SUMMARY

The present disclosure accordingly provides, in a first aspect, a computer implemented method to execute a software application in a network attached computing environment, the application being defined by a set of required software services to constitute the application, the required services being selected from services indicated in a component registry, the comprising: recording a block to a blockchain data structure, the new block identifying at least a subset of the set of required services; receiving one or more further blocks from the blockchain data structure, each of the further blocks referencing a service provider for providing one or more of the required services; and selecting one or more service providers identified in the blockchain and defining a specification for an application assembler component to assemble the software application, the specification identifying selected service providers.

In some embodiments, each of the further blocks define a performance characteristic of a service provided by a service provider referenced by the block.

In some embodiments, the performance characteristic is one or more of: a threshold extent of resource consumption by the service; and a threshold rate of resource consumption by the service.

In some embodiments, selecting one or more service providers is based on the performance characteristics of each of the further block.

In some embodiments, the method further comprises an application assembly component assembling the application for deployment as an executable application.

The present disclosure accordingly provides, in a second aspect, a computer system including a processor and memory storing computer program code for performing a method of an embodiment of the disclosure.

The present disclosure accordingly provides, in a third aspect, a computer program element comprising computer program code to, when loaded into a computer system and executed thereon, cause the computer to perform the method as described above.

BRIEF DESCRIPTION OF THE DRAWINGS

An embodiment of the present disclosure will now be described, by way of example only, with reference to the accompanying drawings, in which:

FIG. 7 is a schematic illustration of the feature of FIG. 5 applied to multiple applications deployed to multiple network attached cloud computing environments in accordance with embodiments of the present disclosure.

FIG. 12 is a component diagram of a system for assembling a software application in a network attached computing environment in accordance with an embodiment of the present disclosure.

FIG. 13 is a flow diagram showing a method for assembling a software application in a network attached computing environment in accordance with an embodiment of the present disclosure.

DETAILED DESCRIPTION

Figure 1:
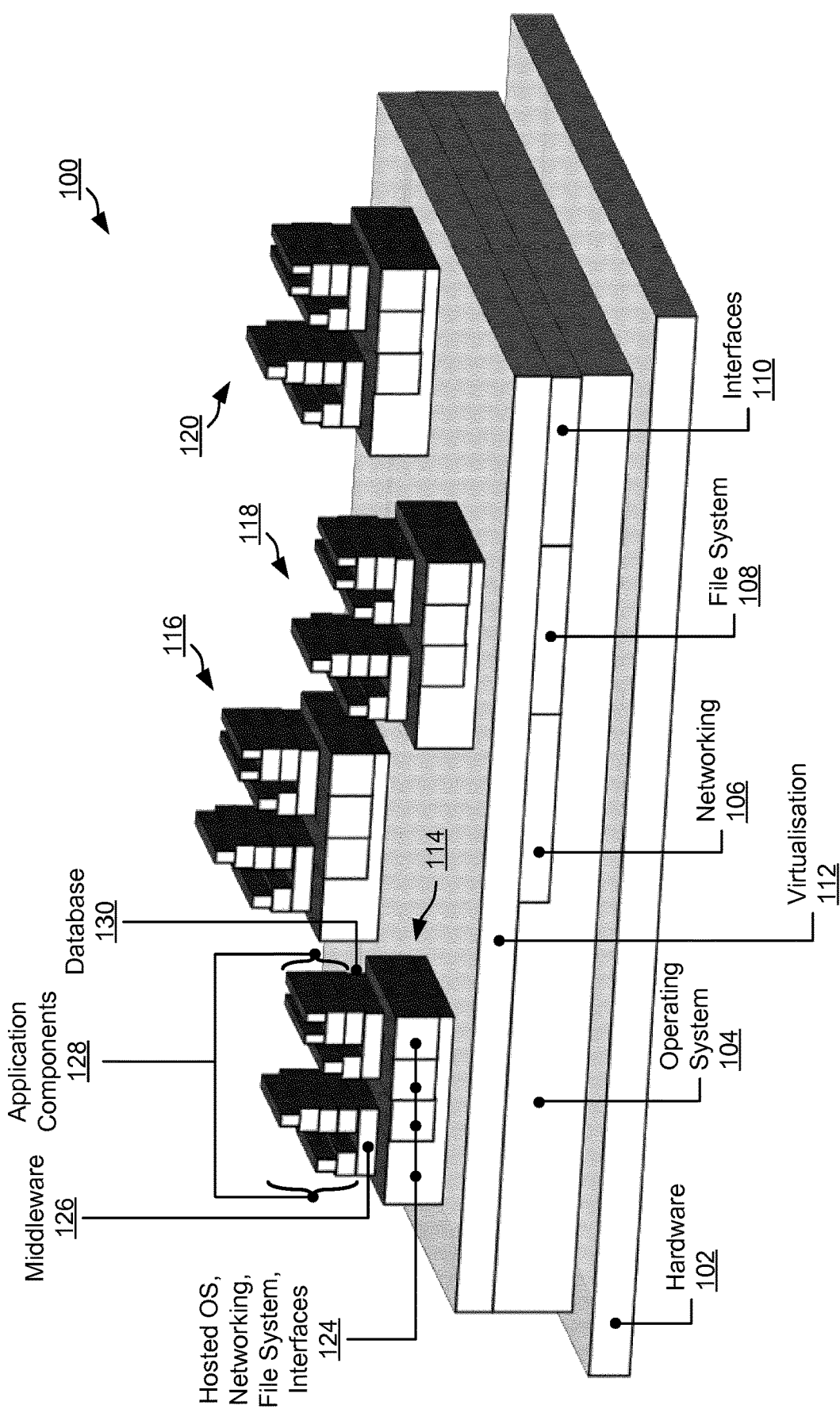
FIG. 1 is a conceptual diagram of a network attached cloud computing environment 100 with which embodiments of the present disclosure can be applied.

FIG. 1 is a conceptual diagram of a network attached cloud computing environment 100 with which embodiments of the present disclosure can be applied. A cloud computing environment 100 is a shared, virtualized computing environment as described below. The cloud computing environment 100 includes one or more hardware devices 102 such as computer systems each having: one or more processor units; a memory store; an internal bus; and one or more interfaces for communication with, inter alia, devices, computer systems, peripherals and the like. While a single hardware layer 102 is depicted in FIG. 1, it will be apparent to those skilled in the art that multiple connected, interoperating or cooperating hardware devices could be employed such as multiple computer systems arranged in rack-based computing arrangements and the like.

An operating system 104 is stored in a memory or other store for execution by processor(s) of the environment 100. The operating system includes, inter alia, services for networking 106, file system 108 and programmatic interfaces 110 for operating system services, devices and the like. A virtualization software component 112 provides a virtualized computing environment in which the physical arrangement of a computer system (including the hardware 102) is abstracted to generate one or more virtual computer systems, known as virtual machines 114, 116, 118, 120.

For example, a virtual machine can be provided as a particular operating system executing within a virtualized computing environment having a hypervisor on a hardware device or, potentially, a distributed arrangement of hardware devices. The virtualized computing environment can be provided as a service-based technology such that the environment is delivered as a service for the installation and execution of a software application. In one embodiment, the virtualized environment is provided as part of a Cloud Computing service provided by a Cloud Computing service provider such as BT Cloud Compute available from British Telecommunications plc. Additionally or alternatively, the virtualized computing environment can be provided as, or operate with, a service based infrastructure and/or platform such as IaaS and/or PaaS.

Software applications are deployed to the cloud computing environment 100 by instantiating virtual machines 114, 116, 118, 120 and installing and configuring operating system and application software therein. Deployment of a software application includes any or all of installing, configuring, arranging and adapting the software application such that the application is executable within the virtualized computing environment. For example, a web based software application can be installed to execute with an operating system executing on a virtual machine, the virtual machine being configured to include networking facilities and the virtual machine also having installed thereon a web server having a certain configuration, a database and certain other requirements defined for the application. All such installation and configuration such that the web based software application is executable in the virtualized computing environment is part of the deployment of the application.

A software application for deployment to the cloud computing environment 100 has associated an assembly definition suitable for use in deploying the software application with the virtualized computing environment. For example, the assembly definition can include a specification of an architecture of the software application and/or an architecture of software components required for the application. The assembly definition further includes specifiers or descriptors of application or other software or platform components that are required for the deployment of the application.

In the exemplary arrangement of FIG. 1, a cloud application is deployed in a virtual machine 114 by the provision of a software platform (PaaS), and software components (SaaS). The platform includes an operating system 124 hosted in the virtual machine along with middleware software 126 and database software 130. Application components 128 execute in conjunction with these platform components. Thus the software application can be considered a stack of software components executing within the virtual machine 114, as depicted in FIG. 1. Where multiple virtual machines 114, 116, 118, 120 are instantiated, multiple, potentially disparate, stacks of software components can be deployed as multiple applications, all executing in the cloud computing environment 100.

The cloud computing environment of FIG. 1 is network attached in that it is suitable for being in communication with other computer systems such as computer systems of entities, users or organizations using applications deployed in the cloud computing environment. The precise nature of the network is not relevant here, save to say that a wired, wireless, mobile or fixed network could be employed.

Figure 2:
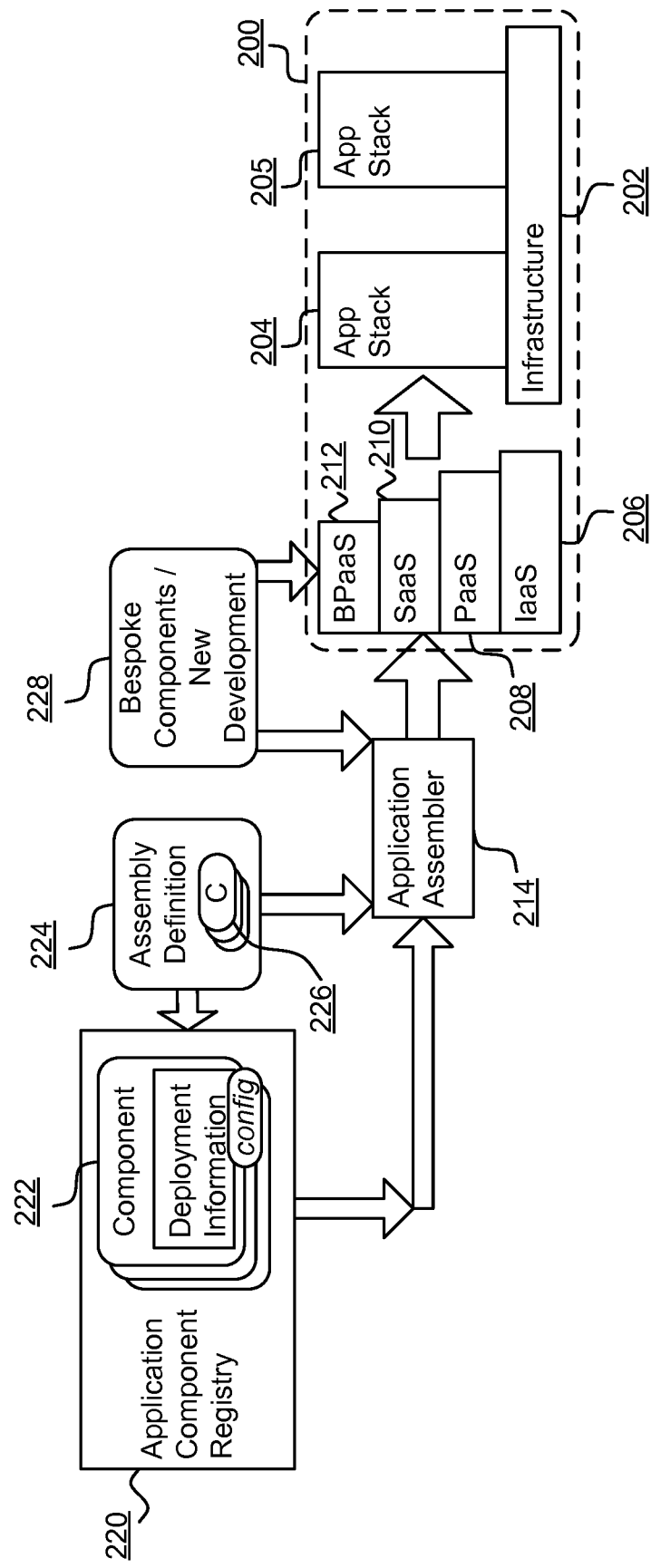
FIG. 2 is a flow diagram illustrating assembly and deployment of a software application for a cloud computing environment.

FIG. 2 is a flow diagram illustrating assembly and deployment of a software application 204 for a cloud computing environment 200. An application component registry 220 is provided, the registry 220 storing or being associated with a set of software components 222 suitable for selection as part of a software application 204 for deployment to the cloud environment 200. The registry 220 is a data store, memory, repository, knowledgebase or the like and has associated an interface for the selection of components 222 in the construction of an application 204. In one embodiment, the registry 220 is provided as a catalogue of components 222 from which the software application 204 can be assembled.

Components 222 can include any number of components for selection in the assembly of the application 204. Such components can range from infrastructure components (IaaS), platform components (PaaS), application software components (SaaS) and business process components (Business Process as a Service, BPaaS). For example, the registry 220 can offer components 222 including any number of operating systems such as multiple variants, versions or editions of Microsoft Windows, multiple Linux distributions and potentially multiple kernel compilations or packages of each Linux distribution. Further, the registry 220 can include: middleware software such as messaging middleware, transaction middleware, web services middleware, including potentially multiple offerings from differing vendors and supporting differing platforms, operating systems, etc.; execution or runtime environments such as one or more java virtual machine environments of particular editions, versions and configurations, including potentially multiple offerings from differing vendors and supporting differing platforms, operating systems, etc.; database software including database middleware, object oriented databases, relational databases, including potentially multiple offerings from differing vendors and supporting differing platforms, operating systems, etc.; server software such as data servers, web servers, messaging servers and the like; business, commercial, application, web, internet and other software; and any other software components 222 that may conceivably be assembled into a cloud application 204 stack.

Application 204 is defined by an assembly definition 224 specifying a set 226 of the components 222 required for the assembly and deployment of the application 204. The assembly definition 224 is constructed, designed or specified via an interface of the registry 220. The interface can be a user interface for a human application designer or builder, or a programmatic, data or other interface for the interaction of an automated application design tool such as an automated application builder adapted to identify components 222 for assembly based on an application requirements specification or the like.

Each component 222 has associated descriptive information (not shown). Descriptive information includes one or more descriptions of the component 222 which may include, inter alia: a description of the function, purpose, compatibilities and characteristics of the component 222; a description of configurable aspects of the component 222; information regarding parameter of the component 222; details of compatible environments for the component 222; information regarding dependencies of the component 222 such as other components; and the like. The description can be human readable for presentation to an application designer or builder for the construction of an application for assembly and deployment to the cloud computing environment 200. Alternatively, the description can be a machine readable description for input to an application design tool such as an automated application builder adapted to identify components 222 for assembly based on an application requirements specification or the like. Such machine readable descriptions can be provided in, inter alia, meta-document form such as XML, a data structure or other bytecode or binary format.

Each component 222 further has associated deployment information specifying how the component 222 is to be deployed when assembled as part of a cloud application 204. In some embodiments the deployment information is associated with one or more software packages constituting or embodying the component 222. For example, where component 222 is the Microsoft Windows operating system, the deployment information is associated with one or more software packages constituting all software files required for the installation and execution of the Microsoft Windows operating system. One way such an association can be realized is to include a link or reference to packages constituting Microsoft Windows files residing in a store, such as a store accessible by, or stored within, the cloud environment 200. The deployment information further includes configuration information for assembling, installing and/or configuring the component 222. Such configuration information can include executable or parseable software modules such as scripts, batch files, shell scripts, perl scripts, launchers, installers, wizards and the like for the installation and configuration of the component 222. The deployment information can be dependent upon additional information provided by an application designer, builder, assembly tool or other entity responsible for causing, triggering or commencing the assembly of the application 204. For example, the deployment information can be responsive to parameters, configuration options or attributes provided by an application designer. The nature and type of such additional information as may be required and/or provided for the deployment information depends on the characteristics of the component 222. For example, an operating system component can be configured to define particular file systems, memory models, device drivers, storage arrangements, network facilities, user interfaces and the like. On the other hand, a middleware component can be configured to employ particular application runtime environments, messaging mechanisms for message oriented middleware, specify a transaction middleware configuration, application server usage and the like. The vast array of potential software components 222 in the application component registry 220 is such that the precise nature and configuration of each cannot be exhaustively defined and it will be apparent to those skilled in the art that any component suitable for deployment in a cloud computing environment 200 could be employed, and any and all applicable deployment configurations including parameters and options can be specified.

In use set 226 of components 222 are selected for deployment as part of an assembly definition 224. The assembly definition 224 is a representation of, specification of or reference to components 222 selected for deployment of an application including relevant configuration parameters, options and the like. The assembly definition 224 can be embodied as a set of one or more documents in a machine readable language such as markup language documents (e.g. XML), documents in defined or self-defining semantic document formats, defined data structures or binary format(s). An application assembler software component 214 accesses or receives the assembly definition 224 to deploy an application in the cloud computing environment 200 so that the application can execute in the cloud computing environment 200. The application assembler 214 and application component registry 220 are illustrated as separate software elements external to the cloud environment 200. In one embodiment the assembler 214 and registry 220 are provided by network attached computer systems communicatively connected to each other and the cloud environment 200, such as by way of a computer network. Alternatively, the assembler 214 and registry 220 are provided within the cloud computing environment 200, such as hosted at a computer system of the environment 200. Further, the assembler 214 and registry 220 can be provided as separate, separable or integrated elements. For example, the assembler 214 and registry 220 can be functions or facilities of a common software element.

The cloud computing environment 200 includes an infrastructure 202 such as a hardware and/or software infrastructure for supporting the deployment of cloud applications 204, 205. The infrastructure can be provided as a service such as is known as IaaS 206. Atop the infrastructure the cloud computing environment 200 can support one or more platforms (PaaS 208), software applications (SaaS 210) and business process software (BPaaS 212).

In use, the application assembler 214 executes, interprets, parses or otherwise processes deployment information, including any associated configuration information, for each component 222 in a set of components 226 of the assembly definition 224 to effect the deployment of the components 222 as an application 204 in the cloud environment 200. Parameters, options and the like specified as part of the configuration associated with the deployment information for components 222 in the set 226 are used by the application assembler 214 in the deployment of the application 204. In this way, the application 204 is deployed to the cloud computing environment 200.

In some embodiments an application for deployment may not be constructed entirely from components 222 existing in the registry 220. Certain modifications, bespoke tailoring, arrangements or supplements to one or more components 222 may be required for the deployment of an application. For example, additional modules, database drivers, runtime environment extensions, libraries, toolkits, business process software and the like may be required in addition to components 222 in the registry 220. Such requirements can be fulfilled by the provision of bespoke components and/or newly developed components, enhancements, supplements or modifications 228 (hereinafter referred to as bespoke components 228). Bespoke components 228 can be included in a deployed cloud application 204 as part of the process of assembly by the application assembler 214 and/or after assembly and during installation, execution, configuration or at runtime of the deployed cloud application 204. Notably, the provision, availability, servicing and support of any such bespoke components 228 may depend on the availability of appropriate services, resources, facilities and the like in the cloud computing environment 200. Thus, the services provided by a cloud computing service provider can limit the ability of an application designer to specify an assembly definition 224 and provide required or desired bespoke components 228.

Figure 3:
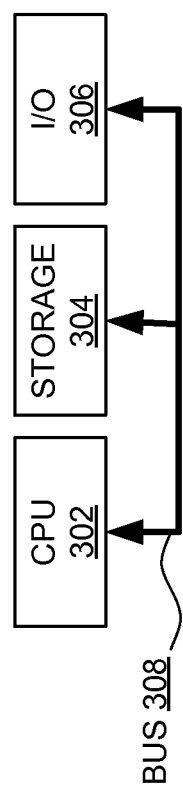
FIG. 3 is a block diagram of a computer system suitable for the operation of embodiments of the present disclosure.

FIG. 3 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 4:
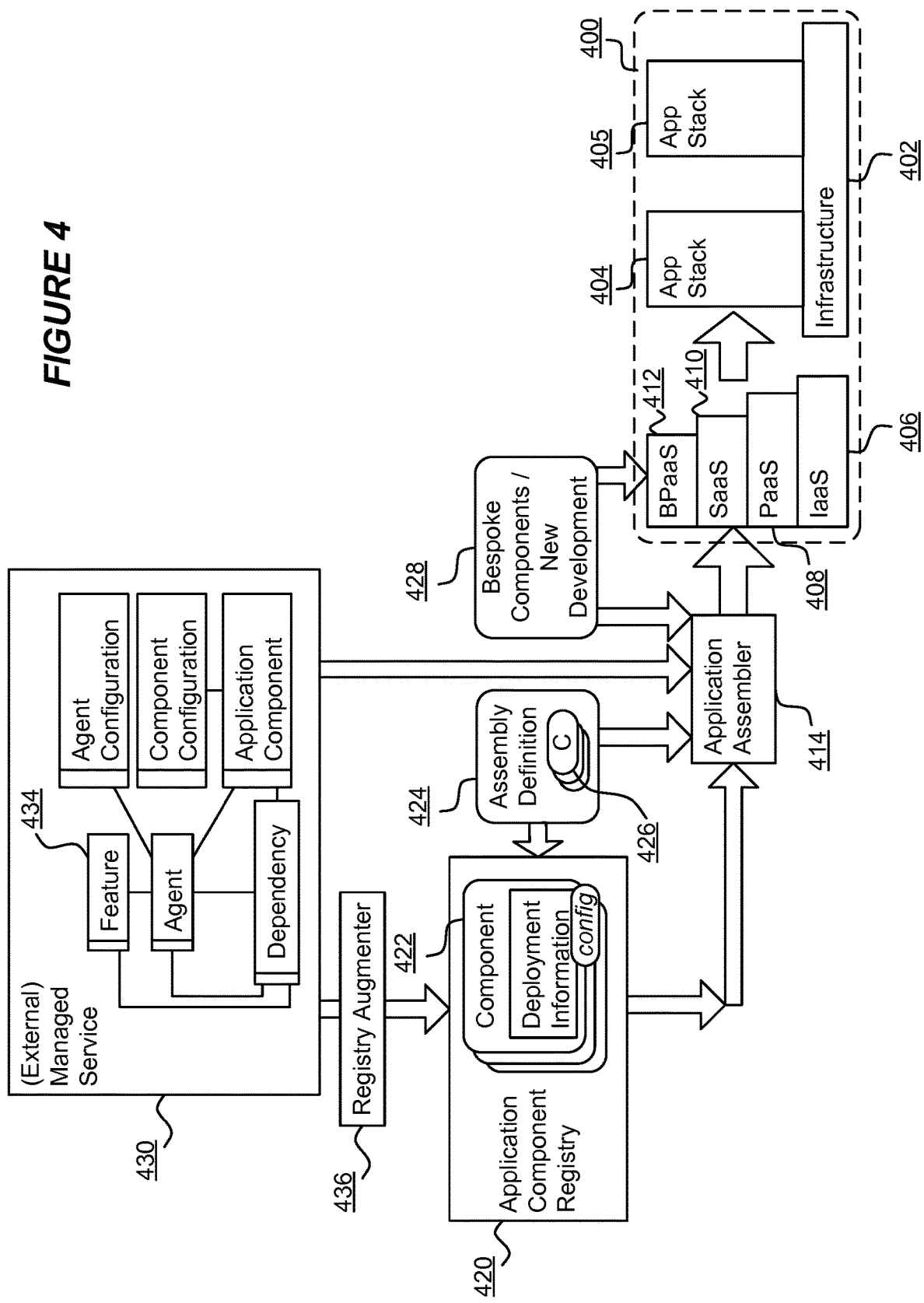
FIG. 4 is a flow diagram illustrating assembly and deployment of a software application with a software feature partly provided by a network attached computing service external to the cloud computing environment in accordance with embodiments of the present disclosure.

FIG. 4 is a flow diagram illustrating assembly and deployment of a software application 404 with a software feature partly provided by a network attached computing service 430 external to the cloud computing environment 400 in accordance with embodiments of the present disclosure. Many of the elements of FIG. 4 are the same as those described above with respect to FIG. 2 and these will not be repeated here. The arrangement of FIG. 4 further includes a network connected environment 430 that is external to the cloud computing environment 200. The external environment 430 is provided by a network attached computing service external to the cloud computing environment 200 such that the external environment 430 and the cloud computing environments 200 are provided as separate network connected computing environments that may interoperate, collaborate or communicate only via one or more networks existing therebetween. The external environment 430 includes one or more features 434 as a software feature, function or service for inclusion with a cloud application 404 deployed in the cloud computing environment 400. The feature 434 is a supplementary feature for one or more components 422 in the application component registry 420. The feature 434 is not a component 422 in its own right: rather the feature is a service or function that is applicable to at least two different components 422 and that can be outsourced, delegated or contracted to the external service provider providing the external environment 430. Specifically, the applicability of the feature 434 to multiple components can span different varieties, configurations, versions or vendors of a type of component (such as different components of the type "operating system," etc.) and/or multiple disparate types of component (such as types including: databases, file systems, middleware, etc.) Features can include: security features such as encryption, decryption, key management, intrusion detection, virus detection, firewalls, proxies and the like; authentication features; access control features; features providing or supporting particular protocols, file formats, network communication formats or conversion between formats or protocols and the like; features providing data governance technology or services; language features such as internationalization features; patch management processes; financial handling features such as financial transaction and electronic commerce features; diagnostic features; features required to comply with legal or regulatory requirements; reliability, availability and serviceability features; features providing services in a particular geographic location where required, such as for security, regulatory or legal requirements; and other features conceivably applicable to and/or deployable for components 422 as will be apparent to those skilled in the art.

The arrangement of FIG. 4 further includes a registry augmenter 436 as a software, hardware or firmware tool for augmenting the application component registry 420 such that the registry 420 identifies the availability of feature 434 with compatible components 422. The identification of compatible components and the inclusion of the feature 434 therewith in both the registry 420 and subsequently on assembly and deployment of the application 404 is described below.

Figure 5:
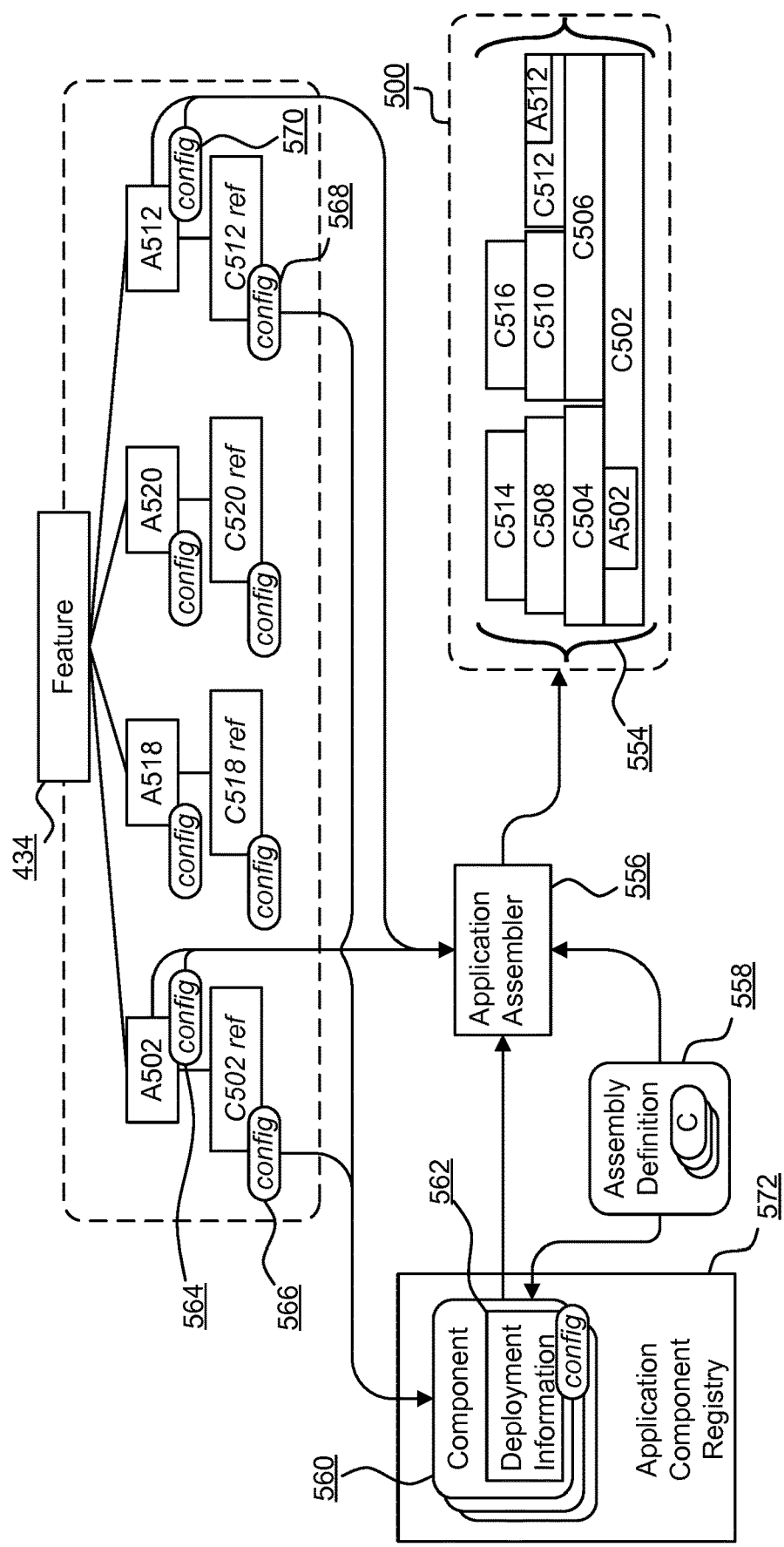
FIG. 5 is a schematic representation of relationships between a software feature and an exemplary application deployed in a network connected cloud computing environment in accordance with embodiments of the present disclosure.

Turning now to FIG. 5 there is provided a schematic representation of relationships between the feature 434 and an exemplary application 554 deployed in a network connected cloud computing environment 500 in accordance with embodiments of the present disclosure. The application 554 includes a stack of components C502 to C516 assembled from a registry 572 and deployed to the cloud environment 500 based on an assembly definition 558. The registry 572 of components 560 has been augmented to include the feature 434 in compatible components. Methods for the augmentation are described in detail below. Compatible components are components in the registry 572 for which the feature 434 has associated feature implementation information comprising a software agent A502, A518, A529, A512 associated with a compatible component, such as by reference to the component. Software agents A502, A518, A520, A512 each has associated a reference C502, C518, C520, C512 to a component that may exist in the registry 572. Notably, the feature 434 may include software agents associated with components not existing in the registry 572. Further, components 560 may exist in the registry 572 for which there is no associated agent in the feature 434. Yet further, each agent may be associated with more than one component reference, such as where an agent is applicable to multiple components, such as multiple versions of a component (e.g. multiple versions of Microsoft Windows may be associated with a single agent). The software agents A502, A518, A520, A512 are software functions, routines, procedures, subroutines, libraries, stubs, hooks, skeletons, proxies, gateways, routers, classes, objects, scripts or the like suitable for installation with a deployed cloud application in the cloud computing environment 500. Specifically, each of the software agents A502, A518, A520, A512 is suitable for deployment with, in association with, as part of, or supplementing a corresponding component according to the associated component reference C502, C518, C520, C512 for the agent. The registry 572 is augmented by the registry augmenter 436 to provide the feature 434 by way of the agents A502, A518, A520, A512 in conjunction with the compatible components 560 in the registry 572. The registry 572 can be augmented by inclusion of a feature description in association with a compatible component and, additionally, deployment information for a compatible component can be augmented, modified or supplemented to include deployment information for an agent associated with a compatible component, such deployment information for an agent being provided by the feature 434. To this end, the component reference associated with each software agent includes component configuration information 566 associated with the component reference for agent A502. The component configuration information 566 defines how a component in the registry 572 should be configured for compatibility with an agent to provide the feature 434. Further, the component configuration information 566 defines how deployment information 562 for a component in the registry 572 should be configured, modified or supplemented to achieve the deployment of an agent to provide the feature 434 as part of the deployment of the component. The component configuration information 566 further includes software agent information identifying information about the associated software agent A502 in order that agent information is included in an assembly definition 558 for application assembler 556 to obtain, install and configure the agent A502 when assembling and deploying an application 554.

Further, the component configuration information defines any pre-requisites or dependencies of an agent for the feature 434 that require inclusion in application assembly definition 558 in order that the feature can be applied. For example, other features, other components, other configurations and the like can be specified as dependencies or pre-requisites. Such dependencies or pre-requisites can be defined in a configuration for an agent 564 or a configuration 566 for a component associated with an agent.

Specifically, the component configuration information defines, specifies, indicates or refers to a location of one or more software packages constituting a functional implementation of an agent A502, A518, A520, A512 which, in one embodiment, will reside in a repository of the external environment 430. In an alternative embodiment, the software packages for agents A502, A518, A520, A512 can be located elsewhere than the external environment 430.

For example, a component C502 in the registry 572 for deployment as part of the application 554 has associated deployment information. The component C502 in the registry 572 is determined to be compatible with the feature 434 based on the availability of an agent A502 in association with a reference to the component C502 ("C502 ref"). In response to this determination, the component C502 in the registry 572 is augmented to indicate the availability of the feature 434 such that an application builder or designer seeking to construct an application assembly is able to select the feature 434 as part of the component C502. To provide for deployment of the feature 434 with component C502, the component C502 is further augmented in the registry 572 such that the deployment information 562 for the component C502 is supplemented by deployment information for the agent A502 from the feature component configuration 566. Further, any specific configuration or configuration changes required for the component C502 to support, provide or interact with the agent A502 are also reflected in the registry 572 based on the configuration 566. Accordingly, an application builder or designer generates an assembly definition 558 for the application 554 including all required components C502 to C516 for the application and selecting the feature 434 for component C502. Subsequently, the application assembler 556 assembles the application 554 for deployment to the cloud environment 500. The application assembler 556 parses, interprets or otherwise processes the assembly definition 558 with reference to the deployment information 562 for all components therein, including deployment information 562 and configuration information that is augmented in the registry 572 for the feature 434. The application assembler 556 assembles the application 554 based upon the assembly definition 558 and with reference to the registry 572 and the deployment information and configuration information for components 560 indicated in the assembly definition 558. For the implementation of the feature 434 for component C502 the application assembler 556 obtains a software package for agent A502 for inclusion with the assembled application from a location indicated in the augmented deployment information for the component C502. The application assembler 556 also optionally accesses an agent configuration 564 which indicates how the agent A502 is to be configured for implementation in application 554. Such configuration information can be component specific (e.g. where the agent A502 supports multiple components) and/or can indicate parameters, options, configuration elements and the like for definition by an application builder as part of the assembly definition 558. Where such parameters etc. require specifying in the assembly definition 558 the agent configuration 564 will be reflected by corresponding indications in the component configuration 566 for augmentation of a component entry 560 in the registry 572. Thus the application 554 is deployed including the components C502 to C516 with component C502 having integrated, linked, associated or supplemented by a software package for agent A502 for providing the feature 434 for the component C502.

FIG. 5 further illustrates a second application of feature 434 to component C512 also included in the assembly for application 554 and deployed to the cloud environment 500. Component C512 is compatible with feature 434 by way of agent A512 having an associated component reference for C512. The component reference "C512 ref," with associated configuration 568, is used to augment the registry 572 and the agent A512, with associated configuration 570, is used by the application assembler 556 to assemble application 554 with feature 434 provided for component A512 by way of inclusion of a software package for agent A512 in the assembled application 554.

Figure 6:
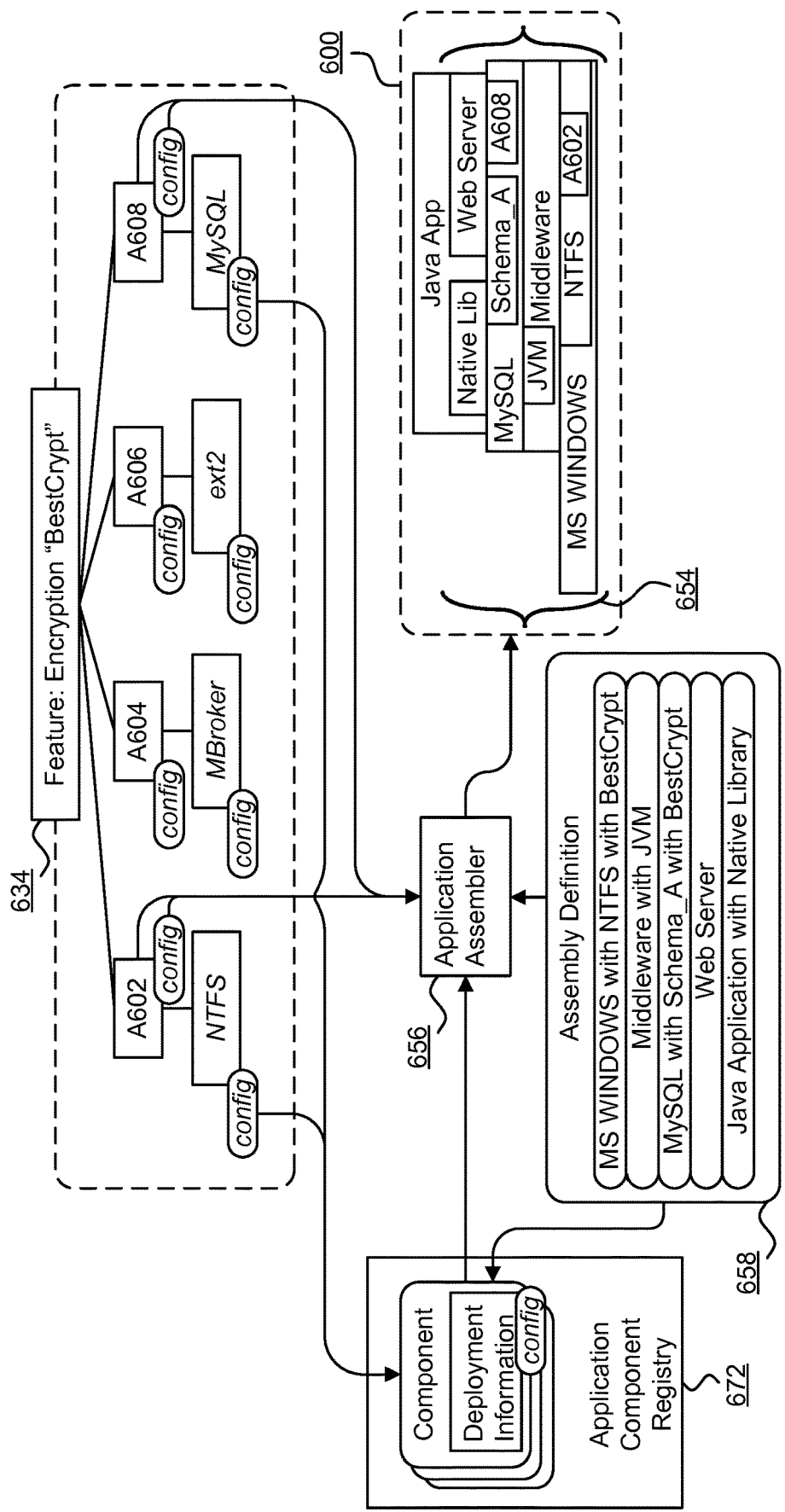
FIG. 6 is a schematic representation of relationships between a feature and an exemplary application deployed in a network connected cloud computing environment in accordance with embodiments of the present disclosure.

By way of further example, FIG. 6 is a schematic representation of relationships between a feature 634 and an exemplary application 604 deployed in a network connected cloud computing environment 600 in accordance with embodiments of the present disclosure. The feature 634 provides encryption as a service known as "BestCrypt" providing support for four disparate components: the NTFS file system for file system encryption provided partly by agent A602; MBroker for message brokered middleware encryption provided partly by agent A604; ext2 for file system encryption provided partly by A606; and MySQL for database encryption provided partly by agent A608. The application component registry 672 is augmented to offer the BestCrypt feature 634 for compatible components NTFS, MBroker, ext2 and MySQL. An application assembly definition 658 defines an application as comprising: a Microsoft Windows operating system having an NTFS filing system with the BestCrypt encryption feature enabled; a middleware component including a Java Virtual Machine (JVM) runtime environment; a MySQL database installation having a scheme "Schema A" and having BestCrypt encryption feature enabled; a web server; and a Java application including a native library accessed via a Java native interface (JNI). The assembly includes all installation and deployment information including configuration information for the components and the agents of feature 634. For example, the installation of Microsoft Windows may include the installation of a software package for the A602 agent as a file system driver or intermediary to implement the encryption functionality of the BestCrypt feature 634 as part of the file system and operating system. Similarly, the MySQL installation may include the installation of a plugin library, hook, stub or skeleton software as a software package for the A608 agent to implement the encryption functionality of the BestCrypt feature 634 as part of the MySQL database runtime to encrypt data stored in databases managed by MySQL.

The application assembler 656 processes the assembly definition 568 with reference to the feature 634 stored in the external environment 430 and the registry 672 (and any other software package repositories as indicated in deployment information and configuration information for installed components and features) in order to assemble the application 654. The assembly can include: configuring the cloud environment 500 to provide a required infrastructure according to the assembly 658; accessing software packages; installing software packages; configuring software packages; installing agents for features; configuring agents for features; and other steps as may be required in order to assemble the software application for execution in the cloud environment 600. On deployment the application 654 includes the components specified in the assembly definition 658 with agents installed and configured to provide the BestCrypt feature for the NTFS file system and the MySQL database. The configuration, management and operation of these agents A502, A512 in use to provide the BestCrypt feature is described below.

In this way a feature 634 of an external environment 430 is selectable for a component and for inclusion in an application assembly definition 658 by way of an augmented registry 672 irrespective of whether the feature 634 is provided by the cloud service provider for the component. Further, the feature 634 can be provided for multiple, potentially disparate components, from the same external environment 430 by the same service provider by way of the component-specific agents providing part of the feature within the application 604 itself. Accordingly there is a centralization of the feature at the external environment 430 by a service provider and the feature can be configured and managed centrally for all components for which the feature is installed. The central configuration and management provides for assured commonality of configuration and management for a feature spanning multiple components in a cloud application deployment. Equally, where required, separation of the configuration and management for different components can be achieved, with configuration and management taking place through a single external environment (e.g. a single management interface). Conceivably, the feature can be extended to apply to multiple applications installed in common or disparate cloud environments, providing centralization of functioning, configuration and management of the feature for potentially multiple components in potentially multiple applications across potentially multiple cloud environments.

In use, the feature 634 is provided in part by the application 654 deployed to the cloud environment 600, and in part by functionality provided by the external environment 430. That part of the feature 634 that is provided by the application 654 is provided by one or more software agents A602, A608 integrated with the application 654 as part of the assembly and deployment of the application 654. When used herein, the provision of "part" of a feature by an element, such as an application (by way of one or more agents) and/or by an external environment, shall be interpreted to mean that the feature is at least partly implemented, executed, instantiated, realized, accessed or obtained at that element, which can include part of the substantive function of the feature (e.g. computer program code implementing part of the feature itself) or alternatively an entry point, hook, proxy, stub or skeleton for the feature so as to provide access to the feature provided substantially elsewhere (another "part" of the feature). That is to say that a software package for a software agent can be a mere stub or interface for a feature, thus a part of the feature, while the substantive function or content of the feature is provided elsewhere such as within the external environment 430. In some embodiments, a combination of a part of a feature implemented at the external environment 430 and a part of the feature implemented by a software agent in a cloud application constitutes implementation of substantially the whole feature. Thus, in one embodiment, a part of a feature implemented at or by a software agent for inclusion within, integration by, assembly within or linking to an application is an "application part", "application portion" or application-side part of the feature, which can include a portion of the implementation of the feature such as a software implementing an application portion of the function of the feature. Similarly, a part of a feature implemented as or by a network attached computing environment external to a cloud computing environment in which the application executes can be considered to be an external part, service-provider part, externally implemented part, remotely implemented part, remote portion, service-provider portion, another portion which can include a portion of the implementation of the feature such as software implementing an application portion of the function of the feature. In one embodiment, the application part of a feature is an interface, proxy or link to an implementation of the substantive functions of the feature, the substantive functions being implemented in the external environment (e.g. as an "external part"). In such an embodiment the feature can be comprised of an interface part (or proxy part, reference part) at the application (e.g. an agent) and a substantive part at the external environment.

FIG. 7 is a schematic illustration of the feature of FIG. 5 applied to multiple applications 704a, 704b, 704c deployed to multiple network attached cloud computing environments 700a, 700b in accordance with embodiments of the present disclosure. It can be seen in FIG. 7 that the feature 434 is applied by way of the multiple software agents A502, A518, A520, A512 across disparate applications and cloud environments while being centrally managed as a managed service at the external environment 430. The cloud environments 700a, 700b could conceivably reside in different computer systems provided by different cloud service providers, either as public cloud services or private cloud services.

Figure 8:
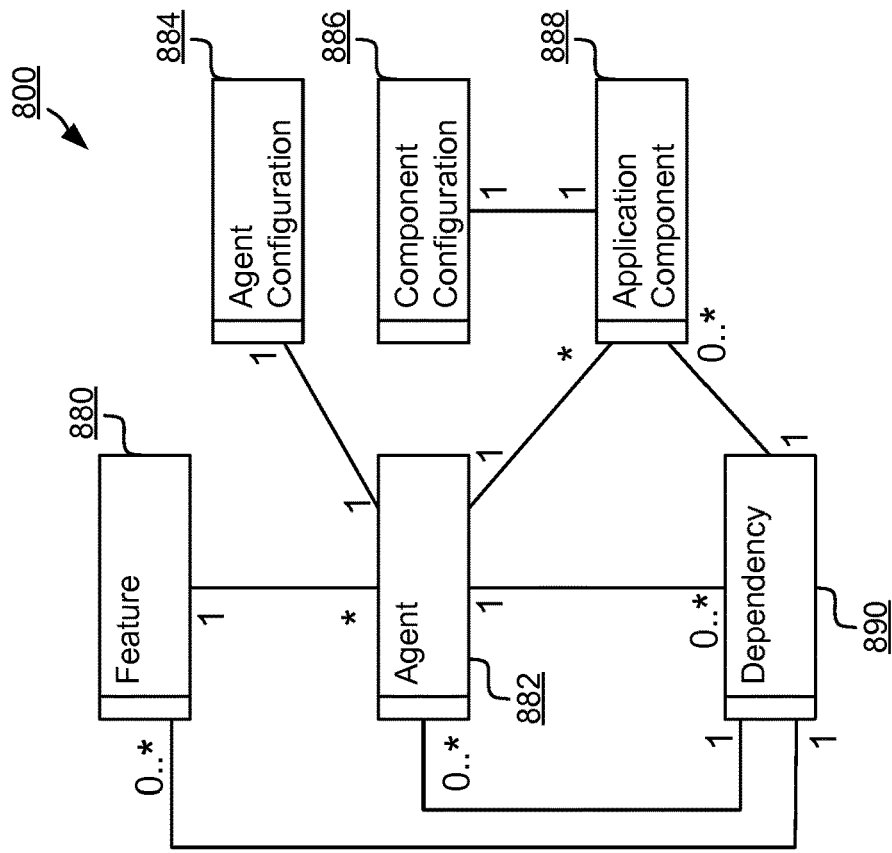
FIG. 8 is an exemplary data schema defining entity relationships for a feature in accordance with an of the present disclosure.

FIG. 8 is an exemplary data schema 800 defining entity relationships for the feature 434 in accordance with one embodiment of the present disclosure. The data entities in the entity relationship diagram can be used by the registry augmenter 436 to augment an application component registry 420 to include features for compatible components, and by the application assembler 414 to access agent configuration information and to satisfy dependencies.

A feature 880 is associated with one or more agents 882 that are embodied as software packages for providing part of the feature functionality within a deployed application in a cloud computing environment. An agent is associated with one or more application components 888, each application component being associated with a component configuration 886 as hereinbefore described. An agent 882 is further associated with an agent configuration 884 as hereinbefore described. Thus the registry augmenter 436 uses the application component 888 associations for agents 882 of a feature 880 to identify potentially compatible application components within an application component registry 420 for augmentation of the registry 420 to offer the feature 880 in conjunction with compatible components.

An agent 882 has zero or more dependencies, each dependency defining a requirement, pre-requisite or other condition that must be satisfied before the agent 882 can be applied for a component in an application assembly. A dependency 890 is associated with zero or more agents 882 (whether associated with the same feature 880 or not), application components 888 (whether associated with the same feature 880 or not) and/or other features 880 such that the associated agents 882, components 888 and/or features 880 are required in order for the dependency to be satisfied. Thus, the registry augmenter 436 uses the dependencies 890 for an agent 882 for a feature 880 to associate features, components and/or agents in the application component registry 420 to ensure dependencies are satisfied during feature selection (or, alternatively, to indicate such dependencies during feature selection to inform an application designer or builder). Additionally or alternatively, the application assembler 414 uses the dependencies 890 for an agent 882 for a feature 880 to select, assemble and deploy prerequisite features, components and/or agents as part of the application assembly and deployment process to ensure dependencies are satisfied by an application on installation and/or at runtime.

Figure 9:
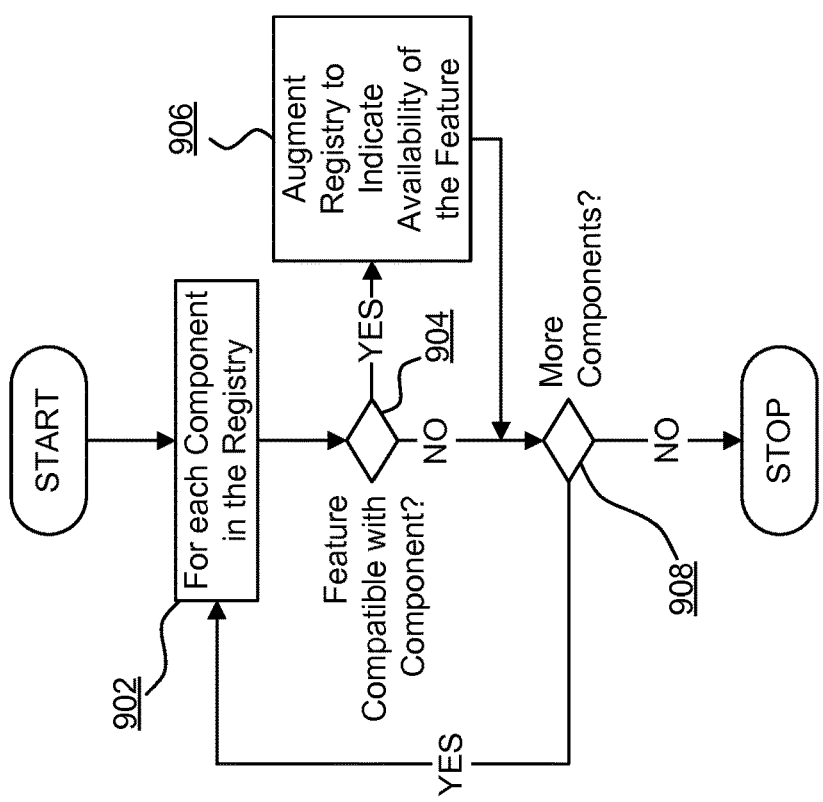
FIG. 9 is a flowchart of a method of the registry augmenter of FIG. 4 in accordance with embodiments of the present disclosure.

FIG. 9 is a flowchart of a method of the registry augmenter 436 of FIG. 4 in accordance with embodiments of the present disclosure. The augmenter 436 processes the application component registry 420 for a feature 434 to augment the registry 420 to indicate availability of the feature 434 and to provide configuration and deployment information for the feature 434 for compatible components. Initially, at 902, the augmenter 436 commences iteration for each component in the application component registry 420. At 904 the method determines if a current component is compatible with the feature 434. In one embodiment compatibility with the feature 434 is determined with reference to agents 882 associated with the feature 434 and components 888 associated with the agents 882 such that a current component that has associated an agent 882 for the feature 434 is compatible with the feature 434. Alternative approaches to identifying compatibility can be employed as will be apparent to those skilled in the art including, inter alia: the maintenance of a register, record or table of compatibilities; references to a service maintaining compatibility information; and the like.

If the method determines that the current component is compatible with the feature 434 at 904 the method proceeds to 906 where the registry 420 is augmented to indicate availability of the feature 434 for the current component. In one embodiment augmentation of the registry 420 includes augmenting, modifying, supplementing or otherwise adapting deployment information for the current component in the registry 420 based on agent configuration information 884 for an agent 882 associated with the current component in the definition of the feature 434. Further, in one embodiment, augmentation of the registry 420 includes augmenting, modifying, supplementing or otherwise adapting the registry 420 to include, indicate or define pre-requisite components 888, features 880 or agents 882 based on agent dependency information 890 for an agent 882 associated with the current component in the definition of the feature 434.

Subsequently, at 908, the method determines if further components are to be processed in the registry 420 and iterates accordingly.

Figure 10:
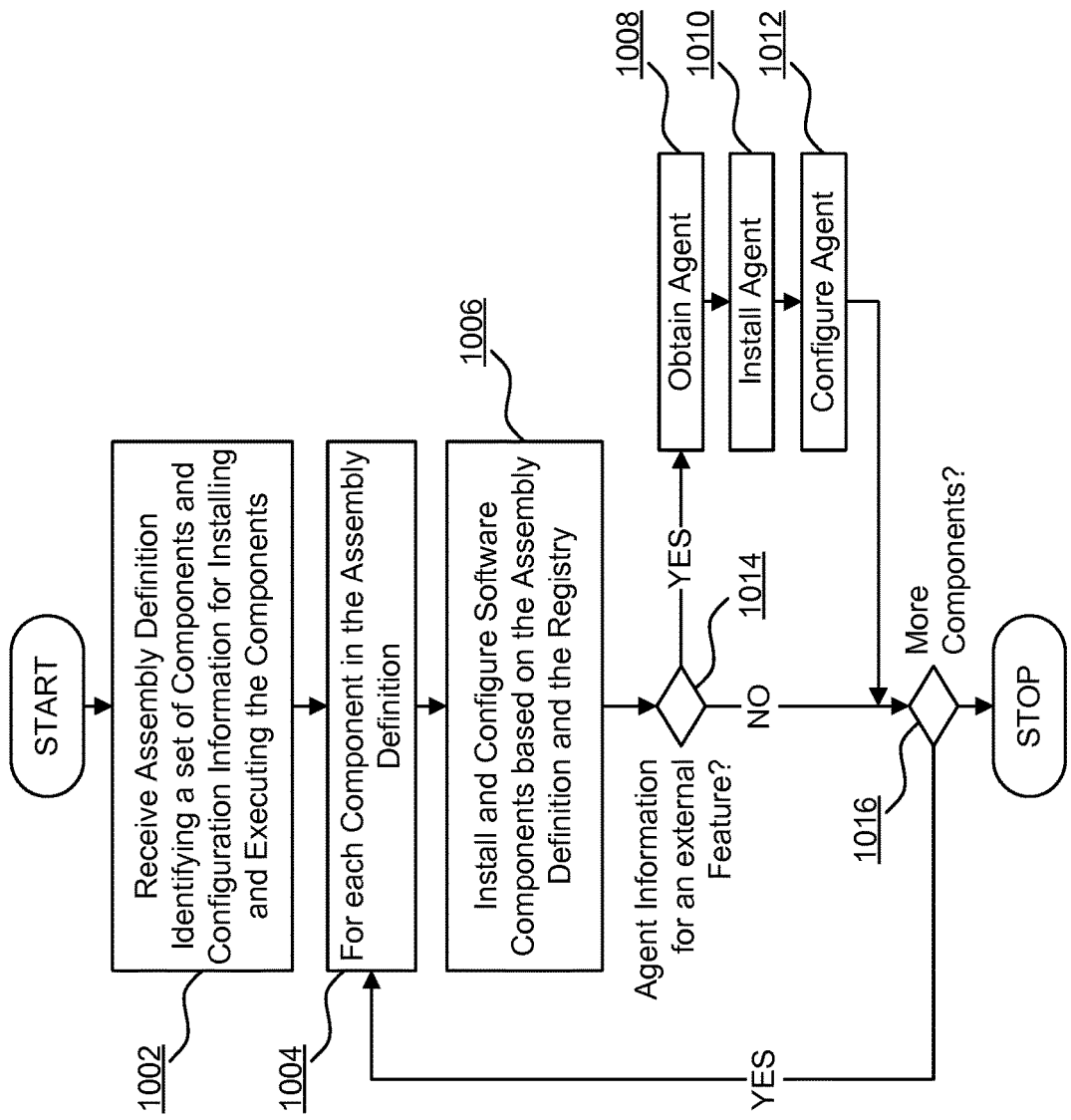
FIG. 10 is a flowchart of a method of the application assembler of FIG. 4 in accordance with embodiments of the present disclosure.

FIG. 10 is a flowchart of a method of the application assembler 424 of FIG. 4 in accordance with embodiments of the present disclosure. The application assembler 424 is a software, hardware or firmware component operable to assemble a cloud application 404 in accordance with an assembly definition 424 as a definition of the application identifying a set 426 of software components and including configuration information for installing and executing the components in a cloud computing environment 400. Components in the set 426 are selected from the registry 420 augmented by the registry augmenter 436. Components in the set 426 can have associated software agent information for a software agent to implement a feature 434, the software agent information informing how the application assembler 414 is to obtain, install and configure a software agent to provide part of the software feature for the application.

Initially, at 1002, the method receives an assembly definition 424 identifying a set 426 of components and configuration information for installing and executing the components in a cloud environment 400. At 1004 the method commences iteration through the components in the assembly definition 424. At 1006 a current software component is installed and configured based on the assembly definition. The installation will include reference to the registry 420 or a store of component information external to the registry 420 including deployment information for the current component. At 1014 the method determines if the assembly definition 424 for the current component includes agent information for a software feature 434 provided by an external environment. Where agent information is provided for the current component, the method obtains the software agent at 1008, installs the software agent at 1010 and configures the software agent at 1012. The installation and configuration of the software agent at 1010 and 1012 can be undertaken simultaneously or in a different order to that illustrated, and agent configuration can also be obtained in whole or in part from the external environment. Notably, the location of the agent for obtaining the agent at 1008 can be indicated in the assembly definition 424. Subsequently, at 1016, the method iterates for the next component in the assembly definition 424.

It will be apparent to those skilled in the art that the 1006 and 1014 may be undertaken in a different order to those illustrated. Further, in some embodiments the application assembler 414 can undertake additional steps. For example, the application assembler 414 can undertake dependency checking for a software agent with reference to a definition of agency dependencies 890, and may undertake 1008 to 1012 for pre-requisite agents. Further, the method can include the installation of pre-requisite features (by way of the installation of associated agents) and/or the installation of pre-requisite components (which may themselves include agent information).

Figure 11:
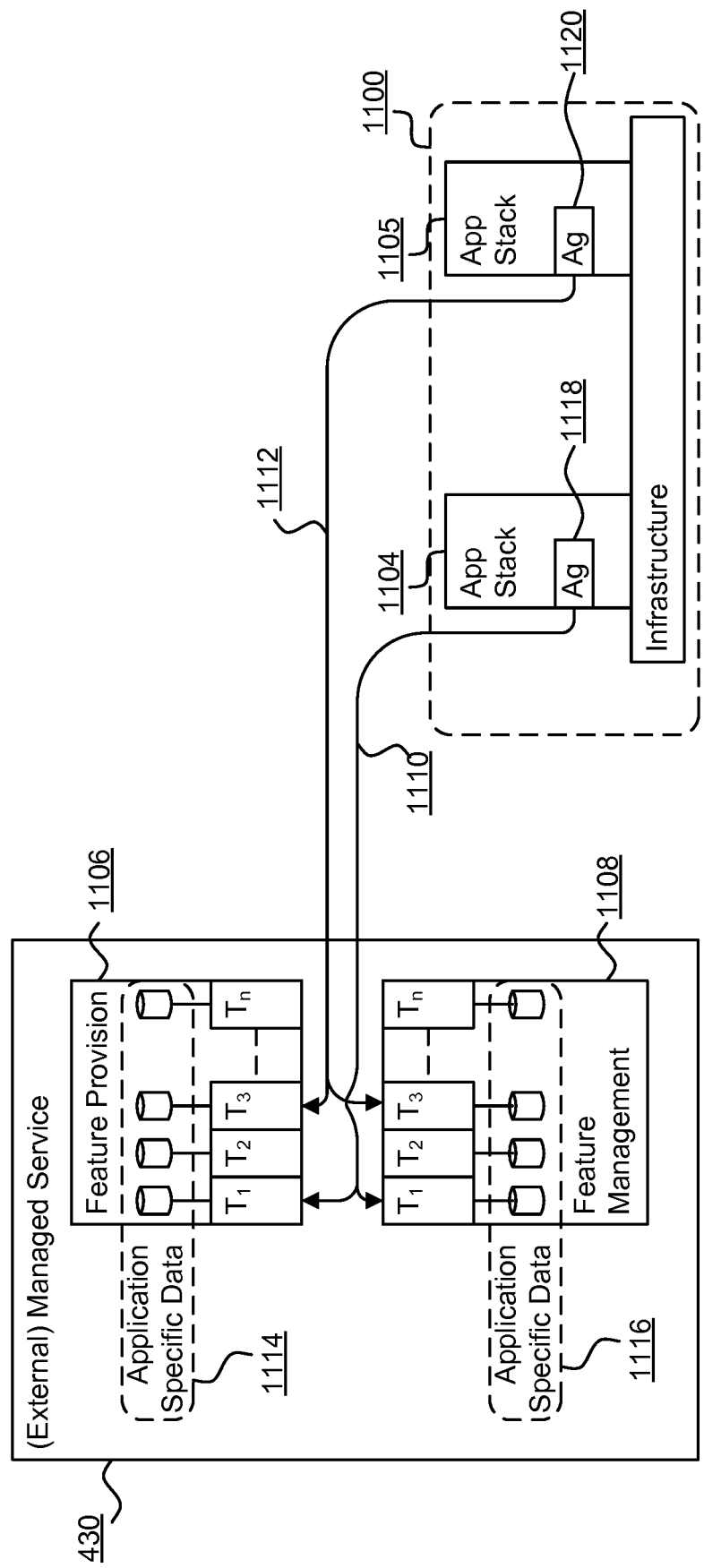
FIG. 11 is a schematic illustration of cloud applications in execution having a feature provided by an external environment in accordance with embodiments of the present disclosure.

FIG. 11 is a schematic illustration of cloud applications 1104, 1105 in execution having a feature provided by an external environment 430 in accordance with embodiments of the present disclosure. On deployment of a cloud application including a feature provided by a managed service provider at an external environment 430, one or more software agents of the feature deployed as part of the cloud application serve to provide part of the feature, with another part of the feature being provided by the external environment 430. Furthermore, configuration and management of the feature for a particular application, or a particular component of an application, or a suite of applications, is centralized at the external environment 430. In use, a deployed and executing cloud application 1104 includes, as part of, in association with, or accessibly by a component of the application 1104, a software agent 1118 providing part of the feature of the external environment 430. Another part of the feature is provided by a feature provision function 1106 of the external environment 430 as a software, hardware, firmware or combination component of the external environment adapted to provide part of the feature. For example, where the feature relates to encryption services, the agent 1118 may provide a part of the feature of encryption and decryption functions including cryptographic algorithms within the application 1104 whereas the feature provision component 1106 may provide key storage, key management, access control lists, authorization and authentication services for the encryption feature. The external environment 430 provides part of the feature by way of the feature provision component 1106 for potentially multiple components within an application, for potentially multiple applications and for potentially multiple cloud environments. In one embodiment the feature provision component 1106 is a multi-threaded component including multiple threads $T_1$ to $T_n$ each being dedicated to a particular component, application or cloud environment. Alternatively, multi-process, multi-processor, multi-task or other environments providing multiple discrete processing facilities or streams could be employed. The arrangement of particular facilities (such as threads) of the feature provision component 1106 can be configurable such that an application requiring commonality in provision of a feature across all components implementing the feature in the application may enjoy centralization of the feature provision 1106 in a single, or small set of, threads. Alternatively, an application requiring multiple instances of a feature being separately implemented may enjoy separation of the feature provision 1106 into multiple discrete and separate threads. Each thread of the feature provision component 1106 includes application specific data 1114 for maintaining state and/or record information in respect of the provision of the feature. Alternatively, such storage can be provided on a component-specific or cloud environment-specific basis, or a configurable mixture.

Further, the external environment 430 provides a feature management component 1108 for the management and configuration of a feature deployed in an application 1104. The feature management component 1108 provides component, application or cloud environment specific feature management facilities such as feature configuration, servicing, support, maintenance, update, logging, subscription, access control and other management functions and services as may be required. The operation of the feature management component 1108 can be multi-threaded as described above with respect to the feature provision component 1106, including further application, component or cloud environment specific data 1116.

As illustrated in FIG. 11, further applications (whether in the same cloud environment, as illustrated, or a different cloud environment) are able to implement a feature from a common external environment 430 with separation in the feature provision 1106 and management 1108 facilities. In one embodiment the separation of the functionality of the common feature provision 1106 and feature management 1108 facilities is provided securely so as to ensure security of the feature functionality at the shared external environment 430. In one embodiment the external environment 430 is a virtualized environment such as a cloud computing environment in which feature provision 1106 and feature management 1108 are provided in secure and different virtual machines for different or unrelated applications such that security between the provision of features for different or unrelated applications can be assured via the virtualization mechanism. Thus, in this way, the feature provided by the external environment 430 is a managed cloud service in itself.

FIG. 12 is a component diagram of a system for assembling a software application in a network attached computing environment in accordance with an embodiment of the present disclosure. A software application for deployment to the network attached environment, such as a cloud, virtualized or other application, is specified by way of an application specification 1250 that identifies one or more software services 1252a to n such as application components required to constitute the application. The application specification 1250 can, for example, take the form of a software workflow identifying directly or indirectly software services 1252 required for its implementation. The services 1252 are selected from components identified by an application component registry 1272 substantially as hereinbefore described. In some embodiments of the present disclosure the registry 1272, or components associated with, accessible by and to, or operable with, the registry 1272 operate to provide an application assembly definition 1258 based on the application specification 1250 for assembly as an application for execution by the application assembler 1256. Thus the application component registry 1272 and the application assembler 1256 are in communication with one or more computer networks 1200 for accessing one or more service providers 1254a to m. The service providers 1254 are network connected entities such as computer systems for providing software services such as services indicated by the registry 1272 and selected for inclusion in the application specification 1250. For example, one service provider 1254 may provide a security service such as an intrusion detection service, or a commercial or business service such as an aspect of a retail shopping application service. The registry 1272 and service providers 1254 are also able to access and interact with a blockchain data structure 1290.

The blockchain data structure 1290 or blockchain database is a sequential transactional database that may be distributed and shared by multiple entities such as registry 1272 and service providers 1254. For example, multiple registries could be provided and the blockchain 1290 can be shared by multiple registries. Distributed sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a data structure is herein referred to as a blockchain 1290 though it will be appreciated that other suitable databases, data structures or mechanisms possessing the characteristics essential for embodiments of the present disclosure could alternatively be used. Typically, a blockchain database is a distributed chain of block data structures accessed by a network of nodes, often referred to as a network of miners. Each block in a blockchain includes a one or more data structures, and in some exemplary blockchains a Merkle tree of hash or digest values for transactions included in a block are used to arrive at a hash value for a block which is itself combined with a hash value for a preceding block to generate a chain of blocks (i.e. a blockchain). A new block of one or more transactions is added to the blockchain by such miner software, hardware, firmware or combination systems in, for example, a miner network. A newly added block constitutes a current state of the blockchain. Such miners undertake validation of substantive content of transactions (such as any criteria defined therein) and adds a block of one or more new transactions to a blockchain as a new blockchain state when a challenge is satisfied as a "proof-of-work", typically such challenge involving a combination hash or digest for a prospective new block and a preceding block in the blockchain and some challenge criterion. Thus miners in a miner network may each generate prospective new blocks for addition to the blockchain. Where a miner satisfies or solves a challenge and validates the transactions in a prospective new block such new block is added to the blockchain. Accordingly, a blockchain provides a distributed mechanism for reliably verifying a data entity such as an entity constituting or representing the potential to consume a resource.

In embodiments of the present disclosure, the blockchain 1290 accessed by the registry 1272 and service providers 1254 can be somewhat simplified yet still provide the benefits of the present disclosure. In particular, the registry 1272 and service providers 1254 can conceivably be the only entities that accesses the blockchain 1290 directly to create new blocks for the blockchain 1290 and to confirm blocks in the blockchain 1290. Further, each block in the blockchain 1290 can conceivably consist of only a single transaction. The proof-of-work requirement can be dispensed with in some embodiments of the present disclosure in view of the limited or exclusive access to the blockchain 1290. Accordingly, in some embodiments of the present disclosure the blockchain 1290 is a type of private or restricted access blockchain accessed and maintained by permitted entities, though this is not essential.

In use the application component registry 1272 creates a new block to the blockchain 1290 for the purpose of identifying, for service providers 1254, service requirements 1252 for the application specification 1250. Service providers 1254 having associated services suitable for satisfying all or part of a service requirement 1252 generate a further block in the blockchain 1290. Blocks generated in the blockchain 1290 form a chain by being hashed (i.e. a hash or digest value is evaluated) including a hash of a preceding block in the blockchain 1290. Thus the hash of a preceding block being hashed for a new block cause each new block to be linked to its immediately preceding block so creating a chain of blocks. In this way the blockchain 1290 provides a reliable and available source of service identification information provided by the registry 1272 for new application specifications 1250 and service offer information provided as new blocks offering services by the service providers 1254. The use of the blockchain 1290 is particularly beneficial when the registry 1272 and/or service providers 1254 encode a particular service level, service characteristic(s) or other features of a required/provided service within blocks in the blockchain 1290. Such encoding in a block becomes irrefutable and readily auditable and constitutes an agreement between an ultimate assembled application employing a service and a service provider. Such characteristics can include an amount of a computing resource consumed by a service provider, a rate of resource consumption by a service provider, or an amount of resource or fiat currency required in exchange for provision of a service by a service provider.

Thus, the application component registry selects, from the blocks in the blockchain 1290, one or more service providers 1254 to fulfill a service requirement 1252 of the application specification 1250. Subsequently the assembly definition 1258 is generated with the selected service provider 1254 services encoded therein for assembly by the assembler 1256 for deployment.

FIG. 13 is a flow diagram showing a method for assembling a software application in a network attached computing environment in accordance with an embodiment of the present disclosure. Initially, at 1302, a requester such as a user or requesting entity/application provides an application specification 1250 including one or more service requirements 1252. At 1304 the registry 1272 records a new block (a service requirement block) identifying required services to the blockchain 1290. At 1306, 1308 and 1310 one or more service providers generate further new blocks for the blockchain 1290 as service block proposals. Each service block proposal seeks to propose a service provision to satisfy one or more of the service requirements 1252. Such service block proposals and/or the service requirement block can optionally stipulate or include a definition of service characteristics, service-level or the like. At 1312 the registry receives the service block proposals for selection therebetween at 1314. The assembly definition 1258 is thus generates based on selected services at 1316.

While the registry 1272 is illustrated and described as the entity performing the steps of service requirement block generation, assembly definition 1258 and interaction with the blockchain 1290, it will be apparent to those skilled in the art that one or more other entities associated with, in communication with, or otherwise operable with the registry can alternatively perform any or all of such functions whether local or remote to the registry 1272.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to execute a software application in a network attached computing environment, the software application being defined by a set of required software services to constitute the software application, the required software services being selected from services indicated in a component registry, the method comprising:
   recording a block to a blockchain data structure, the block identifying at least a subset of the set of required software services as a request to one or more service providers;
   in response to the request, receiving one or more further blocks from the blockchain data structure as service block proposals, each of the further blocks referencing a service provider for providing one or more of the required software services; and
   selecting the one or more service providers identified in the blockchain data structure for installation with the software application in the network attached computing environment and defining a specification for an application assembler component to assemble the software application, the specification identifying selected service providers and one or more configuration parameters for each of the identified selected service providers.

2. The method of claim 1, wherein each of the one or more further blocks define a performance characteristic of a service provided by a service provider referenced by the block.

3. The method of claim 2 wherein the performance characteristic is one or more of: a threshold extent of resource consumption by the service; or a threshold rate of resource consumption by the service.

4. The method of claim 2, wherein selecting one or more service providers is based on the performance characteristics of each of the one or more further blocks.

5. The method of claim 1, further comprising: an application assembly component assembling the software application for deployment as an executable application.

6. A non-transitory computer-readable storage medium storing a computer program element comprising computer program code to, when loaded into a computer system and executed thereon, cause the computer to perform the method as claimed in claim 1.

7. A computer system comprising:
a processor and memory storing computer program code for executing a software application in a network attached computing environment, the software application being defined by a set of required software services to constitute the software application, the required software services being selected from services indicated in a component registry, the processor and memory configured to:
record a block to a blockchain data structure, the block identifying at least a subset of the set of required software services as a request to one or more service providers;
in response to the request, receive one or more further blocks from the blockchain data structure as service block proposals, each of the further blocks referencing a service provider for providing one or more of the required software services; and
select the one or more service providers identified in the blockchain data structure for installation with the software application in the network attached computing environment and define a specification for an application assembler component to assemble the software application, the specification identifying selected service providers and one or more configuration parameters for each of the identified selected service providers.

* * * * *